US011163271B2

(12) United States Patent
Lee et al.

(10) Patent No.: US 11,163,271 B2
(45) Date of Patent: *Nov. 2, 2021

(54) CLOUD BASED BUILDING ENERGY OPTIMIZATION SYSTEM WITH A DYNAMICALLY TRAINED LOAD PREDICTION MODEL

(71) Applicant: Johnson Controls Technology Company, Auburn Hills, MI (US)

(72) Inventors: Young M. Lee, Old Westbury, NY (US); William N. Schroeder, Brookfield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/115,282

(22) Filed: Aug. 28, 2018

(65) Prior Publication Data

US 2020/0073342 A1    Mar. 5, 2020

(51) Int. Cl.
*G05B 13/02* (2006.01)
*H02J 7/00* (2006.01)
(Continued)

(52) U.S. Cl.
CPC .......... *G05B 13/029* (2013.01); *G05B 17/02* (2013.01); *G05F 1/66* (2013.01); *H02J 7/0063* (2013.01)

(58) Field of Classification Search
CPC .... G05B 13/029; G05B 17/02; G05B 13/042; G05B 13/041; G05B 13/048; G05F 1/66;
(Continued)

(56) References Cited

U.S. PATENT DOCUMENTS 4,349,869 A    9/1982 Prett et al.
4,616,308 A    10/1986 Morshedi et al.
(Continued)

FOREIGN PATENT DOCUMENTS

CN    102891495    1/2016
CN    105515032    4/2016
(Continued)

OTHER PUBLICATIONS

Yang et al., Building Energy Prediction With Adaptive Artificial Neural Networks Aug. 2005, Department of Building, Civil and Envr. Engineering, Concordia University, p. 1401-1408. (Year: 2005).*

(Continued)

*Primary Examiner* — Kidest Bahta
(74) *Attorney, Agent, or Firm* — Foley & Lardner LLP

(57) ABSTRACT

A building energy system includes an energy storage system (ESS) configured to store energy received from an energy source and provide the stored energy to one or more pieces of building equipment. The system includes a local building system configured to collect building data and communicate the building data to a cloud platform and the cloud platform configured to receive the building data from the local building system via the network, determine whether to retrain a trained load prediction model based on at least some of the building data, retrain the trained load prediction model based on at least some of the building data in response to a determination to retrain the trained load prediction model, determine a load prediction for the building based on the retrained load prediction model, and cause the local building system to operate.

22 Claims, 16 Drawing Sheets

(51) Int. Cl.
*G05F 1/66* (2006.01)
*G05B 17/02* (2006.01)

(58) Field of Classification Search
CPC .......... H02J 7/0063; H02J 3/32; H02J 3/003;
G06Q 50/06
See application file for complete search history.

(56) References Cited

U.S. PATENT DOCUMENTS

| | | | |
|---|---|---|---|
| 5,212,765 A * | 5/1993 | Skeirik | G05B 13/027 417/44.2 |
| 5,301,101 A | 4/1994 | MacArthur et al. | |
| 5,347,446 A | 9/1994 | Iino et al. | |
| 5,351,184 A | 9/1994 | Lu et al. | |
| 5,408,406 A | 4/1995 | Mathur et al. | |
| 5,442,544 A | 8/1995 | Jelinek | |
| 5,519,605 A | 5/1996 | Cawlfield | |
| 5,572,420 A | 11/1996 | Lu | |
| 5,867,384 A | 2/1999 | Drees et al. | |
| 6,055,483 A | 4/2000 | Lu | |
| 6,122,555 A | 9/2000 | Lu | |
| 6,278,899 B1 | 8/2001 | Piche et al. | |
| 6,347,254 B1 | 2/2002 | Lu | |
| 6,459,939 B1 | 10/2002 | Hugo | |
| 6,757,591 B2 | 6/2004 | Kramer | |
| 6,807,510 B1 | 10/2004 | Backstrom et al. | |
| 6,900,556 B2 | 5/2005 | Provanzana et al. | |
| D517,444 S | 3/2006 | Graff | |
| 7,050,863 B2 | 5/2006 | Mehta et al. | |
| 7,050,866 B2 | 5/2006 | Martin et al. | |
| 7,113,890 B2 | 9/2006 | Frerichs et al. | |
| D531,346 S | 10/2006 | Lin | |
| 7,152,023 B2 | 12/2006 | Das | |
| D534,408 S | 1/2007 | Sultan | |
| 7,165,399 B2 | 1/2007 | Stewart | |
| 7,188,779 B2 | 3/2007 | Alles | |
| 7,197,485 B2 | 3/2007 | Fuller | |
| 7,203,554 B2 | 4/2007 | Fuller | |
| 7,266,416 B2 | 9/2007 | Gallestey et al. | |
| 7,272,454 B2 | 9/2007 | Wojsznis et al. | |
| D553,891 S | 10/2007 | Forney | |
| 7,275,374 B2 | 10/2007 | Stewart et al. | |
| 7,328,074 B2 | 2/2008 | Das et al. | |
| 7,328,577 B2 | 2/2008 | Stewart et al. | |
| D563,984 S | 3/2008 | Okuyama | |
| 7,376,471 B2 | 5/2008 | Das et al. | |
| 7,376,472 B2 | 5/2008 | Wojsznis et al. | |
| 7,389,773 B2 | 6/2008 | Stewart et al. | |
| 7,400,933 B2 | 7/2008 | Rawlings et al. | |
| 7,418,372 B2 | 8/2008 | Nishira et al. | |
| 7,454,253 B2 | 11/2008 | Fan | |
| D585,906 S | 2/2009 | Berg et al. | |
| 7,496,413 B2 | 2/2009 | Fan et al. | |
| D593,107 S | 5/2009 | Shimoda et al. | |
| 7,577,483 B2 | 8/2009 | Fan et al. | |
| 7,591,135 B2 | 9/2009 | Stewart | |
| 7,610,108 B2 | 10/2009 | Boe et al. | |
| D604,570 S | 11/2009 | Frank | |
| D607,008 S | 12/2009 | Kocmick | |
| 7,650,195 B2 | 1/2010 | Fan et al. | |
| 7,664,573 B2 | 2/2010 | Ahmed | |
| 7,676,283 B2 | 3/2010 | Liepold et al. | |
| D613,301 S | 4/2010 | Lee et al. | |
| D621,305 S | 8/2010 | Paluszkiewicz | |
| 7,826,909 B2 | 11/2010 | Attarwala | |
| 7,827,813 B2 | 11/2010 | Seem | |
| 7,839,027 B2 | 11/2010 | Shelton et al. | |
| 7,844,352 B2 | 11/2010 | Vouzis et al. | |
| D628,584 S | 12/2010 | Umezawa | |
| D629,410 S | 12/2010 | Ray et al. | |
| 7,856,281 B2 | 12/2010 | Thiele et al. | |
| D630,784 S | 1/2011 | Robinson et al. | |
| 7,878,178 B2 | 2/2011 | Stewart et al. | |
| 7,894,943 B2 | 2/2011 | Sloup et al. | |
| 7,930,045 B2 | 4/2011 | Cheng | |
| D637,196 S | 5/2011 | Ray et al. | |
| D637,197 S | 5/2011 | Ray et al. | |
| 7,945,352 B2 | 5/2011 | Koc | |
| 7,949,416 B2 | 5/2011 | Fuller | |
| 7,987,005 B2 | 7/2011 | Rund | |
| 7,987,145 B2 | 7/2011 | Baramov | |
| 7,996,140 B2 | 8/2011 | Stewart et al. | |
| 8,005,575 B2 | 8/2011 | Kirchhof | |
| 8,032,235 B2 | 10/2011 | Sayyar-Rodsari | |
| 8,036,758 B2 | 10/2011 | Lu et al. | |
| 8,046,089 B2 | 10/2011 | Renfro et al. | |
| 8,060,258 B2 | 11/2011 | Butoyi | |
| 8,060,290 B2 | 11/2011 | Stewart et al. | |
| 8,073,659 B2 | 12/2011 | Gugaliya et al. | |
| 8,078,291 B2 | 12/2011 | Pekar et al. | |
| 8,096,140 B2 | 1/2012 | Seem | |
| 8,105,029 B2 | 1/2012 | Egedal et al. | |
| D654,926 S | 2/2012 | Lipman et al. | |
| 8,109,255 B2 | 2/2012 | Stewart et al. | |
| 8,121,818 B2 | 2/2012 | Gorinevsky | |
| 8,126,575 B2 | 2/2012 | Attarwala | |
| 8,145,329 B2 | 3/2012 | Pekar et al. | |
| 8,180,493 B1 | 5/2012 | Laskow | |
| 8,185,217 B2 | 5/2012 | Thiele | |
| 8,200,346 B2 | 6/2012 | Thiele | |
| 8,295,989 B2 | 10/2012 | Rettger et al. | |
| D679,725 S | 4/2013 | Tanghe et al. | |
| D679,726 S | 4/2013 | Kobayashi | |
| D681,663 S | 5/2013 | Phelan et al. | |
| D681,664 S | 5/2013 | Phelan et al. | |
| D681,667 S | 5/2013 | Phelan | |
| D687,063 S | 7/2013 | Myung et al. | |
| 8,489,666 B1 | 7/2013 | Nikitin | |
| 8,492,926 B2 | 7/2013 | Collins et al. | |
| 8,495,888 B2 | 7/2013 | Seem | |
| D691,174 S | 10/2013 | Lipman et al. | |
| D692,022 S | 10/2013 | Abratowski et al. | |
| 8,583,520 B1 | 11/2013 | Forbes, Jr. | |
| 8,600,561 B1 | 12/2013 | Modi et al. | |
| 8,600,571 B2 | 12/2013 | Dillon et al. | |
| D697,531 S | 1/2014 | Phelan | |
| D698,816 S | 2/2014 | Phelan et al. | |
| D698,817 S | 2/2014 | Laverack et al. | |
| D702,444 S | 4/2014 | Boyle | |
| D704,734 S | 5/2014 | Wafapoor | |
| 8,843,238 B2 | 9/2014 | Wenzel et al. | |
| 8,875,041 B1 | 10/2014 | Desai et al. | |
| D717,335 S | 11/2014 | Sakuma | |
| D717,822 S | 11/2014 | Brotman et al. | |
| 8,901,411 B2 | 12/2014 | Liu et al. | |
| 8,914,158 B2 | 12/2014 | Geinzer et al. | |
| 8,922,056 B2 | 12/2014 | Thisted | |
| D721,086 S | 1/2015 | Hontz, Jr. | |
| D723,585 S | 3/2015 | Brunner et al. | |
| D725,143 S | 3/2015 | Terleski et al. | |
| 9,002,532 B2 | 4/2015 | Asmus | |
| 9,002,761 B2 | 4/2015 | Montalvo | |
| D728,615 S | 5/2015 | Guzman et al. | |
| D729,270 S | 5/2015 | Clare et al. | |
| 9,036,006 B2 | 5/2015 | Barenbrug et al. | |
| D731,541 S | 6/2015 | Lee | |
| 9,052,797 B2 | 6/2015 | Fitzmaurice et al. | |
| 9,061,599 B2 | 6/2015 | Sisk | |
| 9,081,494 B2 | 7/2015 | Migos | |
| 9,122,383 B2 | 9/2015 | Kamath et al. | |
| D740,308 S | 10/2015 | Kim et al. | |
| 9,152,737 B1 | 10/2015 | Micali et al. | |
| D746,295 S | 12/2015 | Arai et al. | |
| 9,202,297 B1 | 12/2015 | Winters et al. | |
| 9,207,776 B2 | 12/2015 | Jiang | |
| 9,208,747 B2 | 12/2015 | Guehring et al. | |
| 9,213,443 B2 | 12/2015 | Goertz et al. | |
| D746,828 S | 1/2016 | Arai et al. | |
| 9,235,657 B1 | 1/2016 | Wenzel et al. | |
| D749,118 S | 2/2016 | Wang | |
| D751,108 S | 3/2016 | Caldwell | |
| D753,690 S | 4/2016 | Vazquez et al. | |
| D760,769 S | 7/2016 | Ishii et al. | |
| D766,289 S | 9/2016 | Bauer et al. | |

(56) References Cited

U.S. PATENT DOCUMENTS

| | | | |
|---|---|---|---|
| D767,586 S | 9/2016 | Kwon et al. | |
| D767,619 S | 9/2016 | Lin | |
| D767,629 S | 9/2016 | Gupta et al. | |
| 9,436,179 B1 | 9/2016 | Turney et al. | |
| D768,148 S | 10/2016 | Jung et al. | |
| D768,151 S | 10/2016 | Yoo et al. | |
| D775,194 S | 12/2016 | Caldwell | |
| D786,920 S | 5/2017 | Kenny | |
| 9,651,929 B2 | 5/2017 | Horesh et al. | |
| D788,785 S | 6/2017 | Flood et al. | |
| D802,008 S | 11/2017 | Zhang et al. | |
| D806,118 S | 12/2017 | Durrant et al. | |
| 9,852,481 B1 | 12/2017 | Turney et al. | |
| D812,093 S | 3/2018 | Rapp | |
| 2002/0147694 A1* | 10/2002 | Dempsey | G06K 9/6256 706/12 |
| 2003/0048309 A1 | 3/2003 | Tambata et al. | |
| 2003/0065409 A1* | 4/2003 | Raeth | G05B 23/0254 700/31 |
| 2003/0197740 A1 | 10/2003 | Reponen | |
| 2004/0249775 A1* | 12/2004 | Chen | H02J 3/00 706/21 |
| 2005/0062289 A1 | 3/2005 | Cho et al. | |
| 2005/0192915 A1* | 9/2005 | Ahmed | G06N 3/02 706/21 |
| 2007/0080675 A1 | 4/2007 | Gray et al. | |
| 2007/0087756 A1 | 4/2007 | Hoffberg | |
| 2008/0177423 A1* | 7/2008 | Brickfield | H02J 3/008 700/291 |
| 2008/0281663 A1 | 11/2008 | Hakim et al. | |
| 2009/0094173 A1 | 4/2009 | Smith et al. | |
| 2009/0254396 A1 | 10/2009 | Metcalfe | |
| 2009/0313083 A1 | 12/2009 | Dillon et al. | |
| 2009/0319090 A1 | 12/2009 | Dillon et al. | |
| 2010/0017045 A1 | 1/2010 | Nesler et al. | |
| 2010/0076613 A1* | 3/2010 | Imes | G06Q 50/06 700/287 |
| 2010/0087933 A1 | 4/2010 | Cheng | |
| 2010/0090532 A1 | 4/2010 | Shelton et al. | |
| 2010/0198420 A1 | 8/2010 | Rettger et al. | |
| 2010/0198421 A1 | 8/2010 | Fahimi et al. | |
| 2010/0235004 A1 | 9/2010 | Thind | |
| 2010/0269854 A1 | 10/2010 | Barbieri et al. | |
| 2010/0333029 A1 | 12/2010 | Smith et al. | |
| 2011/0022193 A1 | 1/2011 | Panaitescu | |
| 2011/0025258 A1 | 2/2011 | Kim et al. | |
| 2011/0060424 A1 | 3/2011 | Havlena | |
| 2011/0066258 A1 | 3/2011 | Torzhkov et al. | |
| 2011/0088000 A1 | 4/2011 | Mackay | |
| 2011/0125293 A1 | 5/2011 | Havlena | |
| 2011/0184565 A1 | 7/2011 | Peterson | |
| 2011/0190958 A1 | 8/2011 | Hirst | |
| 2011/0204720 A1 | 8/2011 | Ruiz et al. | |
| 2011/0221276 A1 | 9/2011 | Geinzer et al. | |
| 2011/0257789 A1 | 10/2011 | Stewart et al. | |
| 2011/0264289 A1 | 10/2011 | Sawyer et al. | |
| 2011/0276269 A1 | 11/2011 | Hummel | |
| 2011/0301723 A1 | 12/2011 | Pekar et al. | |
| 2012/0010757 A1 | 1/2012 | Francino et al. | |
| 2012/0059351 A1 | 3/2012 | Nordh | |
| 2012/0060505 A1 | 3/2012 | Fuller et al. | |
| 2012/0066168 A1* | 3/2012 | Fadell | G06N 20/00 706/52 |
| 2012/0083930 A1 | 4/2012 | Ilic et al. | |
| 2012/0109620 A1 | 5/2012 | Gaikwad et al. | |
| 2012/0116546 A1 | 5/2012 | Sayyar-Rodsari | |
| 2012/0130555 A1 | 5/2012 | Jelinek | |
| 2012/0130556 A1* | 5/2012 | Marhoefer | G05B 15/02 700/291 |
| 2012/0143385 A1 | 6/2012 | Goldsmith | |
| 2012/0215362 A1 | 8/2012 | Stagner | |
| 2012/0226978 A1 | 9/2012 | Harberts et al. | |
| 2012/0232701 A1 | 9/2012 | Carty et al. | |
| 2012/0259583 A1 | 10/2012 | Noboa et al. | |
| 2012/0261990 A1 | 10/2012 | Collins et al. | |
| 2012/0323396 A1 | 12/2012 | Shelton et al. | |
| 2012/0326511 A1 | 12/2012 | Johnson | |
| 2013/0085614 A1* | 4/2013 | Wenzel | G05B 13/021 700/277 |
| 2013/0086522 A1 | 4/2013 | Shimazu et al. | |
| 2013/0099565 A1 | 4/2013 | Sachs et al. | |
| 2013/0138285 A1 | 5/2013 | Bozchalui et al. | |
| 2013/0154583 A1 | 6/2013 | Shi et al. | |
| 2013/0184884 A1 | 7/2013 | More et al. | |
| 2013/0198691 A1 | 8/2013 | Akita | |
| 2013/0212410 A1 | 8/2013 | Li et al. | |
| 2013/0275919 A1 | 10/2013 | Kamath et al. | |
| 2013/0300194 A1 | 11/2013 | Palmer et al. | |
| 2013/0345880 A1 | 12/2013 | Asmus | |
| 2014/0019892 A1 | 1/2014 | Mayerhofer | |
| 2014/0028321 A1 | 1/2014 | Bourgeois | |
| 2014/0037909 A1 | 2/2014 | Hawwa et al. | |
| 2014/0039709 A1 | 2/2014 | Steven et al. | |
| 2014/0049109 A1 | 2/2014 | Kearns et al. | |
| 2014/0052308 A1 | 2/2014 | Hanafusa | |
| 2014/0058572 A1* | 2/2014 | Stein | H02J 13/0017 700/291 |
| 2014/0089692 A1 | 3/2014 | Hanafusa | |
| 2014/0100810 A1 | 4/2014 | Nielsen | |
| 2014/0152009 A1 | 6/2014 | Meisner et al. | |
| 2014/0159491 A1 | 6/2014 | Kusunose | |
| 2014/0188295 A1 | 7/2014 | Saito et al. | |
| 2014/0236789 A1 | 8/2014 | Caldwell | |
| 2014/0239722 A1 | 8/2014 | Arai et al. | |
| 2014/0279361 A1 | 9/2014 | Streeter et al. | |
| 2014/0336840 A1 | 11/2014 | Geinzer et al. | |
| 2014/0344755 A1 | 11/2014 | Shinde et al. | |
| 2014/0354239 A1 | 12/2014 | Miyazaki et al. | |
| 2014/0358316 A1 | 12/2014 | Shichiri | |
| 2015/0002105 A1 | 1/2015 | Kelly | |
| 2015/0008884 A1* | 1/2015 | Waki | H02J 7/007 320/134 |
| 2015/0019034 A1 | 1/2015 | Gonatas | |
| 2015/0021991 A1 | 1/2015 | Wood et al. | |
| 2015/0045962 A1* | 2/2015 | Wenzel | G05F 1/66 700/276 |
| 2015/0046221 A1 | 2/2015 | Narayan et al. | |
| 2015/0084339 A1 | 3/2015 | McDaniel et al. | |
| 2015/0088315 A1 | 3/2015 | Behrangrad | |
| 2015/0094870 A1 | 4/2015 | Fornage et al. | |
| 2015/0094968 A1 | 4/2015 | Jia et al. | |
| 2015/0127425 A1 | 5/2015 | Greene et al. | |
| 2015/0205509 A1 | 7/2015 | Scriven et al. | |
| 2015/0277467 A1 | 10/2015 | Steven et al. | |
| 2015/0283912 A1 | 10/2015 | Shimizu et al. | |
| 2015/0309484 A1* | 10/2015 | Lyman | H04L 12/2816 700/275 |
| 2015/2831912 | 10/2015 | Shimizu et al. | |
| 2015/0316901 A1 | 11/2015 | Wenzel et al. | |
| 2015/0316902 A1 | 11/2015 | Wenzel et al. | |
| 2015/0316903 A1 | 11/2015 | Asmus et al. | |
| 2015/0316907 A1 | 11/2015 | Elbsat et al. | |
| 2015/0316946 A1 | 11/2015 | Wenzel et al. | |
| 2016/0028234 A1 | 1/2016 | Watanabe et al. | |
| 2016/0047862 A1 | 2/2016 | Shimizu et al. | |
| 2016/0085431 A1 | 3/2016 | Kim et al. | |
| 2016/0098022 A1* | 4/2016 | Wenzel | G05B 13/0265 700/275 |
| 2016/0190810 A1 | 6/2016 | Bhavaraju et al. | |
| 2016/0241042 A1 | 8/2016 | Mammoli et al. | |
| 2016/0254671 A1 | 9/2016 | Cutright et al. | |
| 2016/0259535 A1 | 9/2016 | Fleizach et al. | |
| 2016/0269540 A1 | 9/2016 | Butcher et al. | |
| 2016/0315475 A1 | 10/2016 | Carlson et al. | |
| 2016/0377306 A1 | 12/2016 | Drees et al. | |
| 2017/0060113 A1 | 3/2017 | Kaucic et al. | |
| 2017/0090440 A1 | 3/2017 | Eck et al. | |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |

(56) References Cited

U.S. PATENT DOCUMENTS

| | | |
|---|---|---|
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2018/0031641 A1 | 2/2018 | Drees |
| 2018/0034285 A1 | 2/2018 | Baumgartner et al. |
| 2018/0034286 A1 | 2/2018 | Dorneanu et al. |
| 2018/0054061 A1 | 2/2018 | Dorneanu et al. |
| 2018/0196456 A1 | 7/2018 | Elbsat |
| 2018/0197253 A1 | 7/2018 | Elbsat et al. |
| 2018/0224814 A1 | 8/2018 | Elbsat et al. |

FOREIGN PATENT DOCUMENTS

| | | |
|---|---|---|
| DE | 10 2015 117 914 | 5/2016 |
| EP | 2 506 380 A1 | 10/2012 |
| EP | 2 549 617 A2 | 1/2013 |
| EP | 2 660 943 A1 | 11/2013 |
| EP | 2 773 008 A1 | 9/2014 |
| EP | 2 871 742 A1 | 5/2015 |
| JP | 2014-233096 A | 12/2014 |
| JP | 2015-059924 A | 3/2015 |
| JP | 2016-114469 A | 6/2016 |
| KR | 20150131773 | 11/2015 |
| WO | WO02/15365 A2 | 2/2002 |
| WO | WO 2008/058284 | 5/2008 |
| WO | WO 2010/042550 | 4/2010 |
| WO | WO 2010/057250 | 5/2010 |
| WO | WO 2010/094012 | 8/2010 |
| WO | WO 2011/080548 A1 | 7/2011 |
| WO | WO 2012/122234 | 9/2012 |
| WO | WO 2013/063581 A1 | 5/2013 |
| WO | WO 2014/016727 | 1/2014 |
| WO | WO 2015/019541 A1 | 2/2015 |
| WO | WO 2015/139061 A1 | 9/2015 |
| WO | WO 2016/091577 A1 | 6/2016 |

OTHER PUBLICATIONS

Fan et al., A short-term building cooling load prediction method using deep earning algorithms. 2017, Applied Energy, pp. 222-233. (Year: 2017).*
U.S. Appl. No. 29/611,064, filed Jul. 18, 2017, Johnson Controls Technology Company.
U.S. Appl. No. 29/635,547, filed Jan. 31, 2018, Johnson Controls Technology Company.
25 Mobile App UI Designs for Inspiration, posted at TheDesignInspiration by Kreativa Studio, 2006, 20 pages.
Clue, Graphic Design, Icon Design, UI/UX, posted at Behance.com by Luca Fontana, Apr. 8, 2014, 5 pages.
Donadee et al., AGC Signal Modeling for Energy Storage Operations, Sep. 2014, 2 pages.
Everday App, posted at Dribble.com by Inkration, Aug. 22, 2014, 3 pages.
Hive Active Heating, posted at hivehome.com by A.J. LeBlanc Heating, 2016, 6 pages.
Hoke et al., Active Power Control of Photovoltaic Power Systems, 2013 1st IEEE Conference on Technologies for Sustainability (SusTech), Aug. 1-2, 2013, 8 pages.
Honeywell Lyric Thermostat, posted at pixel-push.com, 2016, 10 pages.
Huang et al., Residential Energy System Control and Management Using Adaptive Dynamic Programming, Aug. 2011, 6 pages.
HVAC Air Quality Honeywell Lyric Thermostat, posted at leblanchvac.com, 2015, 1 page.
Lopez-Martinez et al., Vision-Based System for the Safe Operation of a Solar Power Tower Plant, In Advances in Artificial Intelligence-IBERAMIA 2002, 8th Ibero-American Conference on Artificial Intelligence, Nov. 2002, Springer Berlin Heidelberg, 10 pages.
Maly et al., Optimal Battery Energy Storage System (BESS) Charge Scheduling with Dynamic Programming, Nov. 1995, 6 pages.
Sasikala et al., Coordinated Control and Strategy of Solar Photovoltaic Generators with MPPT and Battery Storage in Micro Grids, International Journal of Scientific Engineering and Technology Research, vol. 3, No. 46, Dec. 2014, 7 pages.
Schweiger et al., Comparison of Several Methods for Determining the Internal Resistance of Lithium Ion Cells, Jun. 3, 2010, 22 pages.
SMA Solar Technology AG, PV and Storage: Solutions with Potential—Energy on demand with the Sunny Central Storage, Brochure, Nov. 30, 2002, 8 pages.
Smart Home, posted at Dribble.com by Gediminas Saulis, May 7, 2015, 3 pages.
Taylor et al., Forecasting Frequency-Corrected Electricity Demand to Support Frequency Control, May 2016, 8 pages.
The Ultimate Trends for UI Inspiration, posted at awwards.com, Apr. 15, 2016, 4 pages.
Van De Ven et al., Optimal Control of Residential Energy Storage Under Price Fluctuations, 2011, 4 pages.
Vertiz et al., Thermal Characterization of Large Size Lithium-Ion Pouch Cell Based on 1d Electro-Thermal Model, 2014, 9 pages.
Yang et al., Optimal Scheduling of a Battery Energy Storage System with Electric Vehicles' Auxiliary for a Distribution Network with Renewable Integration, 2015, 18 pages.
Yoon et al., Charge Scheduling of an Energy Storage System under Time-of-Use Pricing and a Demand Charge, 2014.
Youn et al., Optimal Operating of Energy Storage Using Linear Programming Technique, 2009, 6 pages.
Extended European Search Report for EP Application No. 16154938.1, dated Jun. 23, 2016, 8 pages.
Extended European Search Report for EP Application No. 16154940.7, dated Jun. 30, 2016, 7 pages.
Search Report and Written Opinion for International Application No. PCT/US2016/056165, dated Jan. 3, 2017, 13 pages.
Search Report and Written Opinion for International Application No. PCT/US2016/056167, dated Jan. 3, 2017, 12 pages.
Search Report and Written Opinion for International Application No. PCT/US2016/056169, dated Jan. 3, 2017, 12 pages.
Search Report and Written Opinion for International Application No. PCT/US2016/056170, dated Jan. 18, 2017, 12 pages.
Search Report and Written Opinion for International Application No. PCT/US2016/056179, dated Jan. 19, 2017, 10 pages.
Search Report and Written Opinion for International Application No. PCT/US2016/056182, dated Jan. 4, 2017, 13 pages.
Search Report and Written Opinion for International Application No. PCT/US2016/056183, dated Dec. 20, 2016, 13 pages.
Search Report and Written Opinion for International Application No. PCT/US2016/056184, dated Dec. 20, 2016, 13 pages.
Search Report and Written Opinion for International Application No. PCT/US2016/056186, dated Jan. 16, 2017, 10 pages.
Search Report and Written Opinion for International Application No. PCT/US2016/056187, dated Dec. 9, 2016, 12 pages.
Search Report and Written Opinion for International Application No. PCT/US2016/056189, dated Dec. 21, 2016, 11 pages.
Search Report and Written Opinion for International Application No. PCT/US2016/056190, dated Jan. 18, 2017, 10 pages.
Search Report and Written Opinion for International Application No. PCT/US2016/056192, dated Jan. 16, 2017, 11 pages.
Search Report and Written Opinion for International Application No. PCT/US2017/014193, dated Apr. 18, 2017, 17 pages.
Search Report for International Application No. PCT/US2016/056178, dated Jan. 25, 2017, 3 pages.
Search Report for International Application No. PCT/US2016/056181, dated Jan. 26, 2017, 10 pages.
Search Report for International Application No. PCT/US2017/014191, dated Apr. 19, 2017, 18 pages.
Notice of Allowance for U.S. Appl. No. 29/487,827, dated Jan. 26, 2017, 7 pages.
Office Action for U.S. Appl. No. 29/487,827, dated Jan. 20, 2016, 7 pages.

(56) References Cited

OTHER PUBLICATIONS

Office Action for U.S. Appl. No. 29/487,827, dated Jun. 14, 2016, 11 pages.
Office Action for U.S. Appl. No. 29/487,827, dated Nov. 3, 2016, 8 pages.
Office Action for U.S. Appl. No. 29/601,699, dated Apr. 2, 2018, 7 pages.
Office Action for European Patent Application No. 16787642.4 dated Jun. 21, 2018. 7 pages.
Office Action for U.S. Appl. No. 10/696,507, dated Nov. 13, 2008, 15 pages.
Office Action for U.S. Appl. No. 15/406,593, dated Jun. 1, 2018, 20 pages.
Office Action for U.S. Appl. No. 15/247,793 dated May 10, 2018. 9 pages.
Office Action for U.S. Appl. No. 15/247,777 dated Feb. 9, 2018. 25 pages.
Office Action for U.S. Appl. No. 15/247,784 dated Apr. 19, 2018. 7 pages.
Office Action for U.S. Appl. No. 15/247,788 dated May 7, 2018. 19 pages.
Office Action for U.S. Appl. No. 15/247,869 dated Aug. 9, 2018. 6 pages.
Office Action for U.S. Appl. No. 15/247,875 dated Feb. 8, 2018. 27 pages.
Office Action for U.S. Appl. No. 15/247,880 dated May 11, 2018. 12 pages.
Office Action for U.S. Appl. No. 15/247,881 dated Mar. 8, 2018. 25 pages.
Office Action for U.S. Appl. No. 15/247,883 dated Mar. 21, 2018. 36 pages.
Office Action for U.S. Appl. No. 15/247,885 dated Apr. 16, 2018. 33 pages.
Office Action for U.S. Appl. No. 15/247,886 dated Feb. 9, 2018. 7 pages.

\* cited by examiner

CLOUD BASED BUILDING ENERGY OPTIMIZATION SYSTEM WITH A DYNAMICALLY TRAINED LOAD PREDICTION MODEL

BACKGROUND

The present disclosure relates generally to building systems that consume energy from an energy grid. The present disclosure relates more particularly to an energy storage system (ESS) for a building.

An ESS, such as a battery or battery system, can store and discharge energy consumed from an electric grid of a power company or from another resource provider (e.g., water utility, gas utility, etc.). The energy stored or discharged can be utilized to power various pieces of building equipment of a building. The power company can deploy various dynamic pricing schemes to shift energy usage behavior of consumers and shave peak demand of the electric grid. Dynamic pricing schemes can control charges for electricity consumed by the building and/or the ESS. Two types of pricing schemes for dynamic pricing are time-of-use (TOU) cost and demand charge (DC). Time-of-use cost is a variable pricing structure based on the time of day energy is used and is typically measured in units of dollars per kilowatt-hours ($/kWh). Demand charge is a price based on the maximum power used in a fixed time period and is typically measured in units of dollars per kilowatt ($/kW).

Reacting to dynamic pricing schemes can be difficult, specifically, because the use (e.g., occupancy, building equipment) or construction (e.g., remodeling, equipment upgrades, etc.) of a building can change over time, making it difficult for a building system to be able to appropriately manage the amount of electricity consumed from the electric grid.

SUMMARY

One implementation of the present disclosure is a building energy system for a building. The system includes one or more pieces of building equipment configured to control one or more environmental conditions of the building. The system includes an energy storage system (ESS) configured to store energy received from an energy source and provide the stored energy to the one or more pieces of building equipment to operate the one or more pieces of building equipment. The system includes a processing circuit configured to collect building data associated with the building, the building data indicating at least one state associated with the building, determine whether to retrain a trained load prediction model based on at least some of the building data, retrain the trained load prediction model based on the building data in response to a determination to retrain the trained load prediction model, determine a load prediction for the building based on the retrained load prediction model, and operate the ESS to store the energy received from the energy source or provide the stored energy to the one or more pieces of building equipment to operate the one or more pieces of building equipment.

In some embodiments, the processing circuit is configured to select a portion of the building data based on values of the building data in response to the determination to retrain the load prediction model, wherein the selected portion of the building data is data of a preceding time period, wherein a length of the time period is based on the values of the building data. In some embodiments, the processing circuit is configured to retrain the trained load prediction model based on the selected portion of the building data.

In some embodiments, the processing circuit is configured to receive current building data, wherein the current building data includes at least one of a weather forecast, a current occupancy level, an actual previous load, a previous load prediction, a time of day, or a day of week and generate the load prediction based on the retrained load prediction model with the current building data as an input to the retrained load prediction model.

In some embodiments, the building data includes building occupancy data. In some embodiments, the processing circuit is configured to determine whether to retrain the trained load prediction model based on the occupancy data by determining whether the occupancy data indicates a change in an occupancy pattern of the building.

In some embodiments, the building data includes weather data indicating weather conditions associated with the building. In some embodiments, the processing circuit is configured to determine whether to retrain the trained load prediction model based on the weather data indicating a change in a pattern of the weather conditions associated with the building.

In some embodiments, the building data includes actual load data indicating an actual load of the building. In some embodiments, the processing circuit is configured to determine whether to retrain the trained load prediction model by determining whether the actual load data indicates a change in a load pattern of the building.

In some embodiments, the building data includes calendar information indicating at least one of a current date and a current time. In some embodiments, the processing circuit is configured to determine whether to retrain the trained load prediction model by determining, based on the calendar information, whether an environmental season has changed.

In some embodiments, the load prediction model is at least one of a generalized additive model (GAM), a Random Forecast (RF) model, a support vector machine (SVM) model, a generalized linear model (GLM), a nonlinear autoregressive exogenous (NARX) model, recurrent neural network (RNN) model, or a time series forecasting long short term memory (LSTM) model.

In some embodiments, the energy source is an electric grid configured to provide electrical energy to the ESS and the one or more pieces of building equipment. In some embodiments, the ESS includes a battery configured to store electrical energy received from the electric grid and provide the stored electrical energy to the one or more pieces of building equipment by charging and discharging the battery based on the electrical energy received from the electric grid.

In some embodiments, the processing circuit is configured to generate an objective function representing costs of the electrical energy provided by the electric grid, wherein the objective function includes one or more electric rates, optimize the objective function with the load prediction to generate a schedule for charging and discharging the battery, and operate the battery to charge or discharge based on the schedule.

In some embodiments, optimizing the objective function with the load prediction includes optimizing the objective function with one or more constraints. In some embodiments, the one or more constraints include a constraint including an equation, wherein the equation is the load prediction set equal to a sum of an amount of electric load consumed from the electric grid by the one or more pieces of building equipment and an amount of load provided by the battery to the one or more pieces of building equipment by discharging the stored electrical energy.

In some embodiments, the objective function includes one or more decision variables, wherein the decision variables include a charging decision variable for charging the battery and a discharging decision variable for discharging the battery.

In some embodiments, the load prediction includes load values, each load value associated with a particular time of multiple times of a time window. In some embodiments, the schedule includes decisions to charge the battery or discharge the battery at each particular time of the time window. In some embodiments, optimizing the objective function with the load prediction to generate the schedule includes optimizing the objective function over the time window.

In some embodiments, the one or more electric rates include a time-of-use cost that varies based on at least one of a time of day or a date and a demand charge that varies based on a load placed on the electric grid by the building and a multiple other buildings. In some embodiments, the objective function is a sum of the time-of-use cost, the demand charge cost, and a cost of battery life.

Another implementation of the present disclosure is a method of energy management for a building. The method includes collecting, by a processing circuit, building data associated with the building, the building data indicating a state associated with the building, determining, by the processing circuit, whether to retrain a trained load prediction model based on at least some of the building data, retraining, by the processing circuit, the trained load prediction model based on the building data in response to a determination to retrain the trained load prediction model, and determining, by the processing circuit, a load prediction for the building based on the retrained load prediction model. The method further includes operating, by the processing circuit, an energy storage system (ESS) to store the energy received from the energy source or provide the stored energy to one or more pieces of building equipment of the building to operate the one or more pieces of building equipment.

In some embodiments, the method further includes selecting, by the processing circuit, a portion of the building data based on values of the building data in response to the determination to retrain the load prediction model, wherein the selected portion of the building data is data of a preceding time period, wherein a length of the time period is based on the values of the building data. In some embodiments, retraining the trained load prediction model includes retraining the trained load prediction model based on the selected portion of the building data.

In some embodiments, the method includes receiving, by the processing circuit, current building data, wherein the current building data includes at least one of a weather forecast, a current occupancy level, a previous actual load, a previous load prediction, a time of day, or a day of week and generating, by the processing circuit, the load prediction based on the retrained load prediction model with the current building data as an input to the retrained load prediction model.

In some embodiments, the building data includes building occupancy data. In some embodiments, determining, by the processing circuit, whether to retrain the trained load prediction model is based on the occupancy data and includes determining whether the occupancy data indicates a change in an occupancy pattern of the building. In some embodiments, the building data includes weather data indicating weather conditions associated with the building. In some embodiments, determining, by the processing circuit, whether to retrain the trained load prediction model further includes determining whether the weather data indicates a change in a pattern of the weather conditions associated with the building.

In some embodiments, the building data includes actual load data indicating an actual load of the building. In some embodiments, determining, by the processing circuit, whether to retrain the trained load prediction model includes determining whether the actual load data indicates a change in a load pattern of the building. In some embodiments, the building data includes calendar information indicating at least one of a current date and a current time. In some embodiments, determining whether to retrain the trained load prediction model further includes determining, based on the calendar information, whether an environmental season has changed.

Another implementation of the present disclosure is a building energy system controller for a building including a processing circuit. The processing circuit is configured to collect building data associated with the building, the building data indicating a state associated with the building, determine whether to retrain a trained load prediction model based on at least some of the building data, select a portion of the building data based on values of the building data in response to the determination to retrain the load prediction model, wherein the selected portion of the building data is data of a preceding time period, wherein a length of the time period is based on the values of the building data, retrain the trained load prediction model based on the selected portion of the building data, determine a load prediction for the building based on the retrained load prediction model, and operate the ESS to store the energy received from the energy source or provide the stored energy to the one or more pieces of building equipment to operate the one or more pieces of building equipment.

Another implementation of the present disclosure is a building energy system for a building. The system includes an energy storage system (ESS) configured to store energy received from an energy source and provide the stored energy to one or more pieces of building equipment to operate the one or more pieces of building equipment. The system includes a local building system configured to collect building data and communicate the building data to a cloud platform via a network, the building data indicating a state of the building. The system further includes a cloud platform configured to receive the building data from the local building system via the network, determine whether to retrain a trained load prediction model based on at least some of the building data, and retrain the trained load prediction model based on at least some of the building data in response to a determination to retrain the trained load prediction model. The system is configured to determine a load prediction for the building based on the retrained load prediction model and cause the local building system to operate, based on the load prediction, the ESS to store the energy received from the energy source or provide the stored energy to the one or more pieces of building equipment to operate the one or more pieces of building equipment by communicating with the local building system via the network.

In some embodiments, the cloud platform is configured to select a portion of the building data based on values of the building data in response to the determination to retrain the trained load prediction model, wherein the selected portion of the building data is data of a preceding time period, wherein a length of the time period is based on the values of the building data. In some embodiments, the cloud platform is configured to retrain the trained load prediction model based on the selected portion of the building data.

In some embodiments, the cloud platform is configured to receive current building data, wherein the current building data includes at least one of a weather forecast, a current occupancy level, an actual previous load, a previous load prediction, a time of day, or a day of week and generate the load prediction based on the retrained load prediction model with the current building data as an input to the retrained load prediction model.

In some embodiments, the building data includes building occupancy data. In some embodiments, the cloud platform is configured to determine whether to retrain the trained load prediction model based on the occupancy data by determining whether the occupancy data indicates a change in an occupancy pattern of the building.

In some embodiments, the building data includes weather data indicating weather conditions associated with the building. In some embodiments, the cloud platform is configured to determine whether to retrain the trained load prediction model based on the weather data indicating a change in a pattern of the weather conditions associated with the building.

In some embodiments, the building data includes actual load data indicating an actual load of the building. In some embodiments, the processing circuit is configured to determine whether to retrain the trained load prediction model by determining whether the actual load data indicates a change in a load pattern of the building.

In some embodiments, the building data includes calendar information indicating at least one of a current date and a current time. In some embodiments, the cloud platform is configured to determine whether to retrain the trained load prediction model by determining, based on the calendar information, whether an environmental season has changed.

In some embodiments, the local building system is configured to communicate the building data to the cloud platform by transmitting the building data to the cloud platform via the network at a particular time interval.

In some embodiments, the cloud platform is configured to receive the building data transmitted by the local building system via the network and store the building data in a historical database by appending the received building data transmitted by the local building system to other building data of the historical database in response to a reception of the building data transmitted by the local building system.

In some embodiments, the energy source is an electric grid configured to provide electrical energy to the ESS and the one or more pieces of building equipment. In some embodiments, the ESS includes a battery configured to store electrical energy received from the electric grid and provide the stored electrical energy to the one or more pieces of building equipment by charging and discharging the battery based on the electrical energy received from the electric grid.

In some embodiments, the cloud platform is configured to generate an objective function representing costs of the electrical energy provided by the electric grid, wherein the objective function includes one or more electric rates, optimize the objective function with the load prediction to generate a schedule for charging and discharging the battery, and cause the local building system to operate the battery to charge or discharge based on the schedule.

In some embodiments, optimizing the objective function with the load prediction includes optimizing the objective function with one or more constraints. In some embodiments, the one or more constraints include a constraint including an equation, wherein the equation is the load prediction set equal to a sum of an amount of electric load consumed from the electric grid by the one or more pieces of building equipment and an amount of load provided by the battery to the one or more pieces of building equipment by discharging the stored electrical energy.

In some embodiments, the load prediction includes load values, each load value associated with a particular time of multiple times of a time window. In some embodiments, the schedule includes multiple decisions to charge the battery or discharge the battery at each particular time of the time window. In some embodiments, optimizing the objective function with the load prediction to generate the schedule includes optimizing the objective function over the time window.

In some embodiments, the cloud platform is configured to send, by the network, the schedule to the local building system. In some embodiments, the local building system is configured to receive the schedule from the cloud platform via the network and operate the battery to charge or discharge based on the schedule.

Another implementation of the present disclosure is a method of managing energy for a building. The method includes collecting, by a local building system, building data, communicating, by the local building system, the building data to a cloud platform via a network, the building data indicating a state of the building, receiving, by the cloud platform, the building data from the local building system via the network, determining, by the cloud platform, whether to retrain a trained load prediction model based on at least some of the building data, retraining, by the cloud platform, the trained load prediction model based on at least some of the building data in response to a determination to retrain the trained load prediction model, determining, by the cloud platform, a load prediction for the building based on the retrained load prediction model, and causing, by the cloud platform, the local building system to operate, based on the load prediction, the ESS to store the energy received from the energy source or provide the stored energy to one or more pieces of building equipment to operate the one or more pieces of building equipment by communicating with the local building system via the network.

In some embodiments, communicating, by the local building system, the building data to the cloud platform includes transmitting the building data to the cloud platform via the network at a particular time interval.

In some embodiments, the method includes receiving, by the cloud platform, the building data transmitted by the local building system via the network and storing, by the cloud platform, the building data in a historical database by appending the received building data transmitted by the local building system to other building data of the historical database in response to a reception of the building data transmitted by the local building system.

In some embodiments, the energy source is an electric grid configured to provide electrical energy to the ESS and the one or more pieces of building equipment. In some embodiments, the ESS includes a battery configured to store electrical energy received from the electric grid and provide the stored electrical energy to the one or more pieces of building equipment by charging and discharging the battery based on the electrical energy received from the electric grid. In some embodiments, the method further includes generating, by the cloud platform, an objective function representing costs of the electrical energy provided by the electric grid, wherein the objective function includes one or more electric rates, optimizing, by the cloud platform, the objective function with the load prediction to generate a schedule for charging and discharging the battery, and operating, by the cloud platform, the battery to charge or discharge based on the schedule.

In some embodiments, the method includes sending, by the cloud platform via the network, the schedule to the local building system, receiving, by the local building system, the schedule from the cloud platform via the network, and operating, by the local building system, the battery to charge or discharge based on the schedule.

Another implementation of the present disclosure is a cloud platform for managing energy of a building. In some embodiments, the platform includes a processing circuit configured to receive building data from a local building system of the building via a network, the building data indicating a state of the building, determine whether to retrain a trained load prediction model based on at least some of the building data, retrain the trained load prediction model based on at least some of the building data in response to a determination to retrain the trained load prediction model, determine a load prediction for the building based on the retrained load prediction model, and cause the local building system to operate, based on the load prediction, an energy storage system (ESS) to store energy received from an energy source or provide the stored energy to one or more pieces of building equipment to operate the one or more pieces of building equipment by communicating with the local building system via the network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods are shown for a building energy optimization system for optimizing charging and discharging schedules with load predictions of a dynamically trained load model, according to various exemplary embodiments. A building may have various electrical loads, such as an HVAC system, a lighting system, a security system, etc. Electricity may be purchased from an electrical grid and consumed directly by the various electric loads. However, because electricity prices may be dynamic, costs can be reduced by purchasing energy (e.g., when the electric prices are less than predefined amounts), storing the energy in an ESS, and discharging the stored energy from the ESS when electricity costs rise (e.g., rise above a predetermined amount).

Electric costs can be reduced by predicting a load and/or electricity rates with a prediction model. The predicted load may be an indication of the amount of energy required to power various pieces of building equipment. The predicted rates may be a prediction of the various costs for purchasing electricity from an energy grid. The systems and methods discussed herein can utilize a prediction model to predict loads and/or rates and/or schedule charging and discharging of the ESS based on the predictions. The amount of money saved may be related to the accuracy of the predictions. More accurate predictions may correspond to a greater reduction in electric costs. Therefore, the systems and methods discussed herein can dynamically adapt their predictions based on changing variables e.g., season changes, occupancy patterns changes, equipment deterioration, etc.

The systems and methods described herein can determine when new prediction models should be generated. In this regard, the prediction models can be dynamically trained models. The systems and methods can identify that performance of a prediction model is and/or has deteriorated. The systems and methods can determine the deterioration based on building data e.g., occupancy data, electric meter data, etc. In response to a determination that a prediction model has deteriorated and needs to be retrained, the systems and methods can select a new data set for retraining the prediction model. In some embodiments, the criteria for selecting the new data set is dynamic. For example, it may be advantageous to use one week of past data in a first new model and then use one month of past data in a second new model.

Furthermore, the systems and methods can perform an optimization with an objective function, various constraints, and the predictions of the prediction models to determine optimal and/or improved charging and/or discharging schedules for reducing and/or minimizing electricity costs. The optimization can be integrated with various programs that generate revenue and/or reduce energy costs for a building.

Frequency Response Optimization

Figure 1:
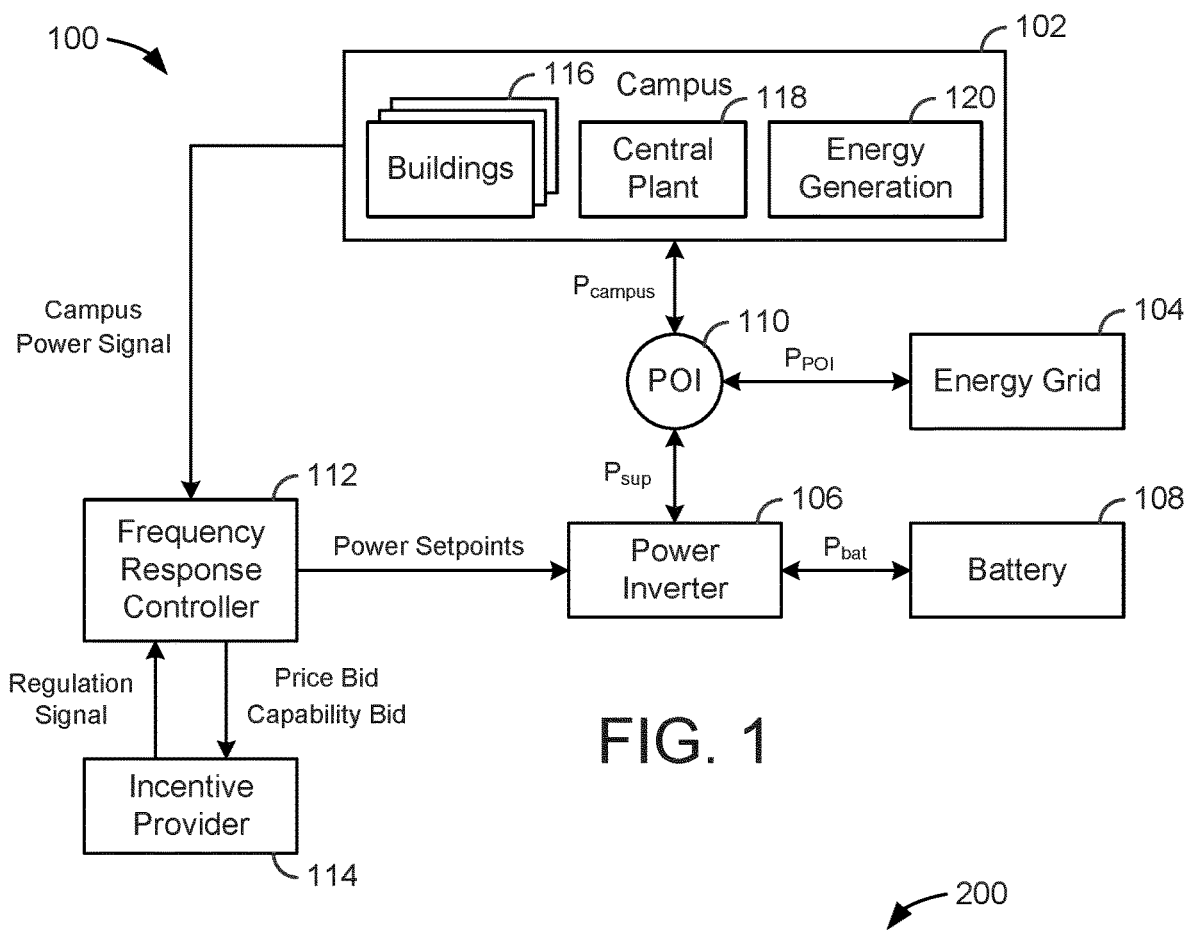
FIG. 1 is a block diagram of a frequency response optimization system, according to an exemplary embodiment.

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants can be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 can be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 can be configured to convert electric power between direct current (DC) and alternating current (AC). For example, battery 108 can be configured to store and output DC power, whereas energy grid 104 and campus 102 can be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{bat}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 can be configured to generate and provide power setpoints to power inverter 106. Power inverter 106 may use the power setpoints to control the amount of power $P_{sup}$ provided to POI 110 or drawn from POI 110. For example, power inverter 106 can be configured to draw power from POI 110 and store the power in battery 108 in response to receiving a negative power setpoint from controller 112. Conversely, power inverter 106 can be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 can be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 can be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
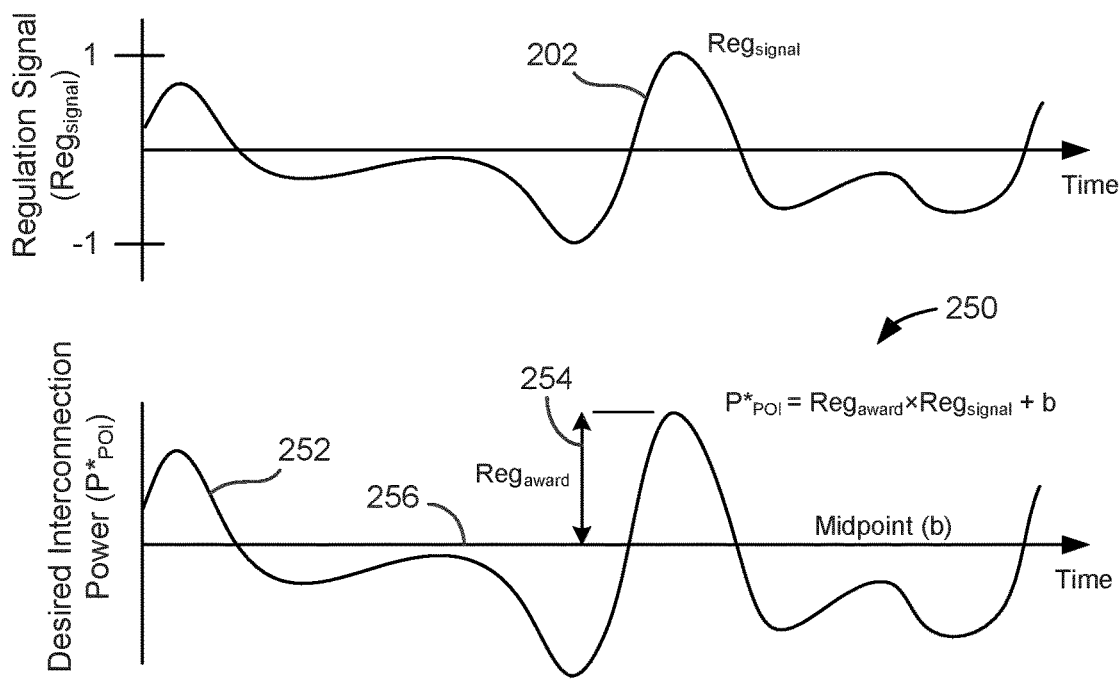
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $\text{Reg}_{signal}$ 202 as a function of time. $\text{Reg}_{signal}$ 202 is shown as a normalized signal ranging from −1 to 1 (i.e., $-1 \leq \text{Reg}_{signal} \leq 1$). $\text{Reg}_{signal}$ 202 may be generated by incentive provider 114 and provided to frequency response controller 112. $\text{Reg}_{signal}$ 202 may define a proportion of the regulation award $\text{Reg}_{award}$ 254 that controller 112 is to add or remove from energy grid 104, relative to a baseline value referred to as the midpoint b 256. For example, if the value of $\text{Reg}_{award}$ 254 is 10 MW, a regulation signal value of 0.5 (i.e., $\text{Reg}_{signal}=0.5$) may indicate that system 100 is requested to add 5 MW of power at POI 110 relative to midpoint b (e.g., $P^*_{POI}=10\text{ MW}\times0.5+b$), whereas a regulation signal value of −0.3 may indicate that system 100 is requested to remove 3 MW of power from POI 110 relative to midpoint b (e.g., $P^*_{POI}=10\text{ MW}\times-0.3+b$).

Graph 250 illustrates the desired interconnection power $P^*_{POI}$ 252 as a function of time. $P^*_{POI}$ 252 may be calculated by frequency response controller 112 based on $\text{Reg}_{signal}$ 202, $\text{Reg}_{award}$ 254, and a midpoint b 256. For example, controller 112 may calculate $P^*_{POI}$ 252 using the following equation:

$$P^*_{POI}=\text{Reg}_{award}\times\text{Reg}_{signal}+b$$

where $P^*_{POI}$ represents the desired power at POI 110 (e.g., $P^*_{POI}=P_{sup}+P_{campus}$) and b is the midpoint. Midpoint b may be defined (e.g., set or optimized) by controller 112 and may represent the midpoint of regulation around which the load is modified in response to $\text{Reg}_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P^*_{POI}=\text{Reg}_{award}\times\text{Reg}_{signal}+b$$

where $P^*_{POI}=P_{sup}+P_{campus}$. Positive values of $P^*_{POI}$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P^*_{POI}=\text{Reg}_{award}\times\text{Res}_{FR}+b$$

where $\text{Res}_{FR}$ is an optimal frequency response generated by optimizing a value function. Controller 112 may subtract $P_{campus}$ from $P^*_{POI}$ to generate the power setpoint for power inverter 106 (i.e., $P_{sup}=P_{POI}-P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
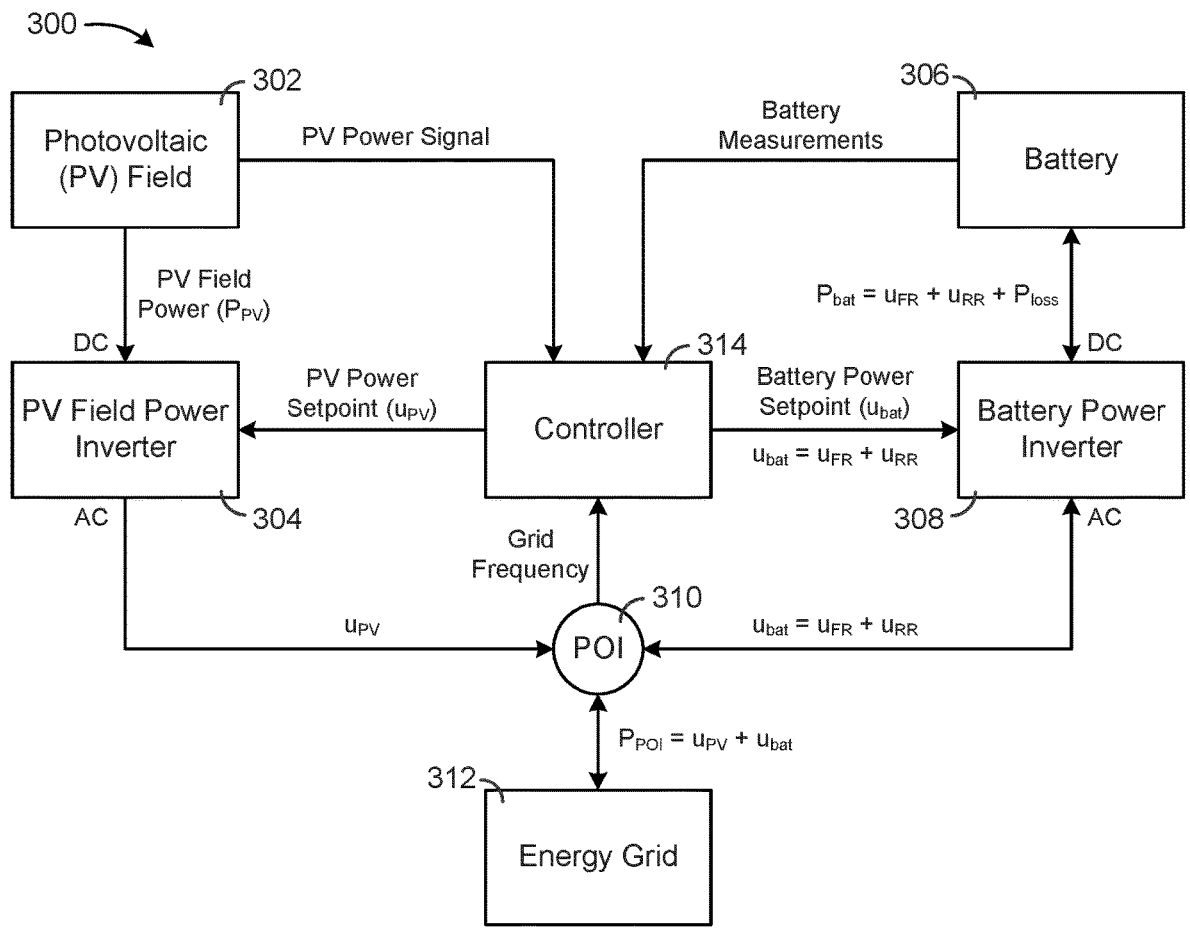
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
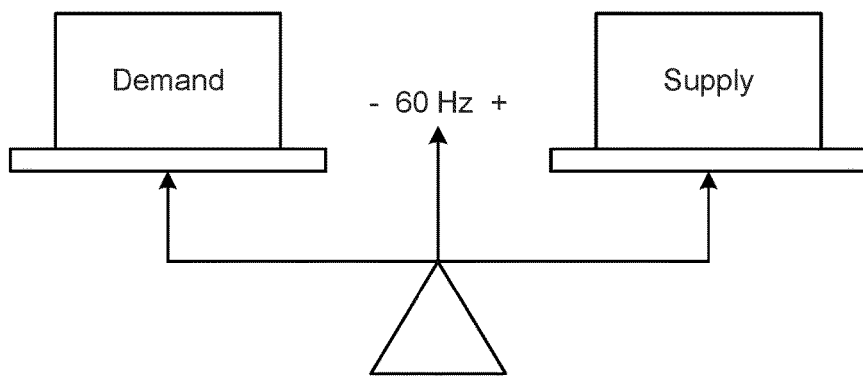
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 can be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 can be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 can be configured to draw a DC power $P_{bat}$ from battery 306, convert the DC power $P_{bat}$ into an AC power $U_{bat}$, and provide the AC power $U_{bat}$ to POI 310. Battery power inverter 308 may also be configured to draw the AC power $U_{bat}$ from POI 310, convert the AC power $U_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $U_{bat}$ may be positive if battery power inverter 308 is providing power to POI 310 or negative if battery power inverter 308 is receiving power from POI 310.

The AC battery power $U_{bat}$ is shown to include an amount of power used for frequency regulation (i.e., $u_{FR}$) and an amount of power used for ramp rate control (i.e., $u_{RR}$) which together form the AC battery power (i.e., $U_{bat}=U_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=U_{FR}+U_{RR}+P_{loss}$). The PV field power $u_{PV}$ and the battery power $U_{bat}$ combine at POI 110 to form $P_{POI}$ (i.e., $P_{POI}=u_{PV}+U_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 can be configured to generate a PV power setpoint $u_{PV}$ for PV field power inverter 304 and a battery power setpoint $U_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $U_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $U_{bat}$ to control an amount of power charged or discharged by battery 306. The battery power setpoint $U_{bat}$ may be positive if controller 314 determines that battery power inverter 308 is to draw power from battery 306 or negative if controller 314 determines that battery power inverter 308 is to store power in battery 306. The magnitude of $U_{bat}$ controls the rate at which energy is charged or discharged by battery 306.

Controller 314 may generate $u_{PV}$ and $U_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $U_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $U_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
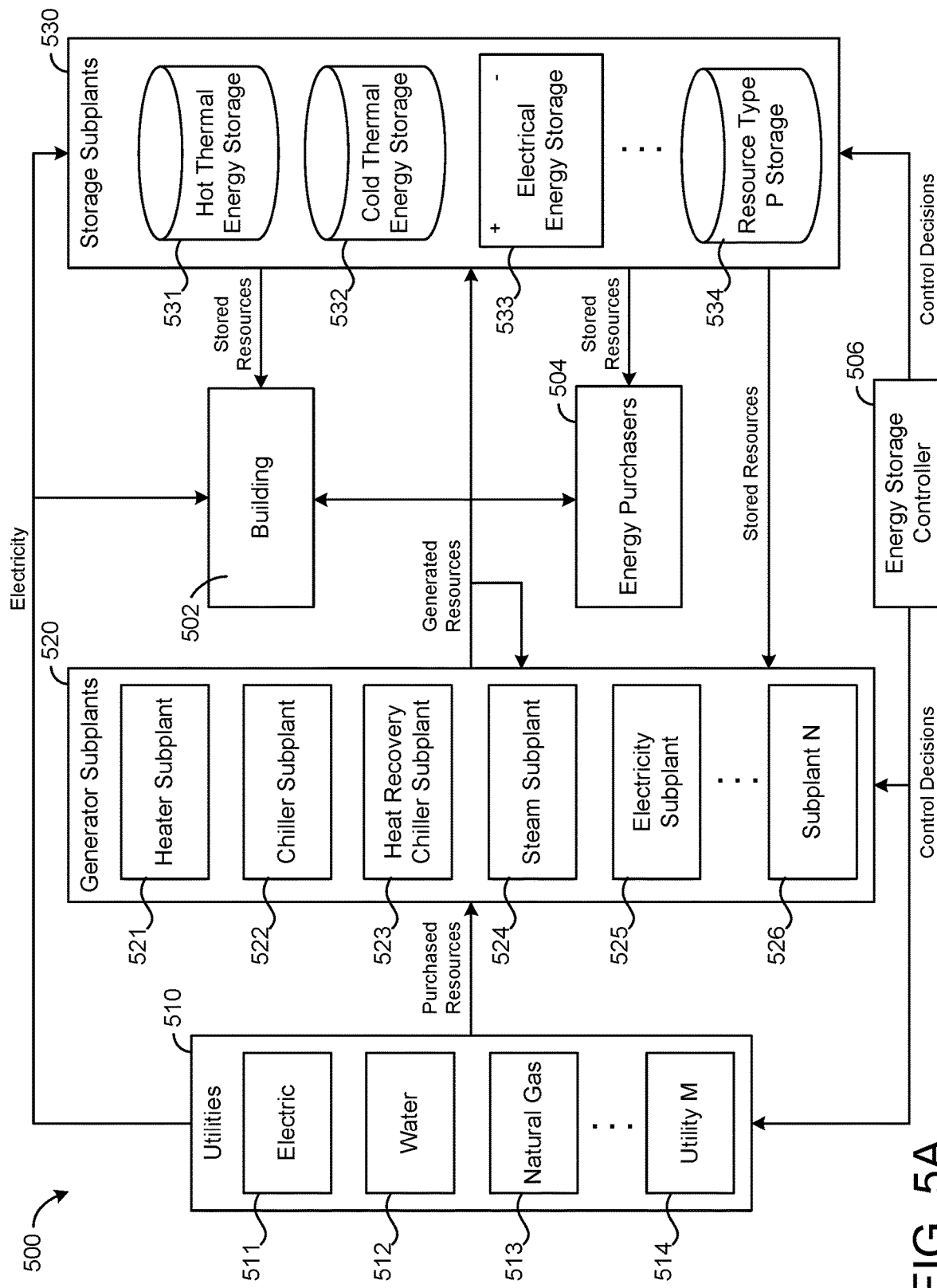
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 can be configured to convert one or more input resources into one or more output resources by operation of the equipment within generator subplants 520. For example, heater subplant 521 can be configured to generate hot thermal energy (e.g., hot water) by heating water using electricity or natural gas. Chiller subplant 522 can be configured to generate cold thermal energy (e.g., cold water) by chilling water using electricity. Heat recovery chiller subplant 523 can be configured to generate hot thermal energy and cold thermal energy by removing heat from one water supply and adding the heat to another water supply. Steam subplant 524 can be configured to generate steam by boiling water using electricity or natural gas. Electricity subplant 525 can be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 can be configured to store energy and other types of resources for later use. Each of storage subplants 530 can be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 can be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 can be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
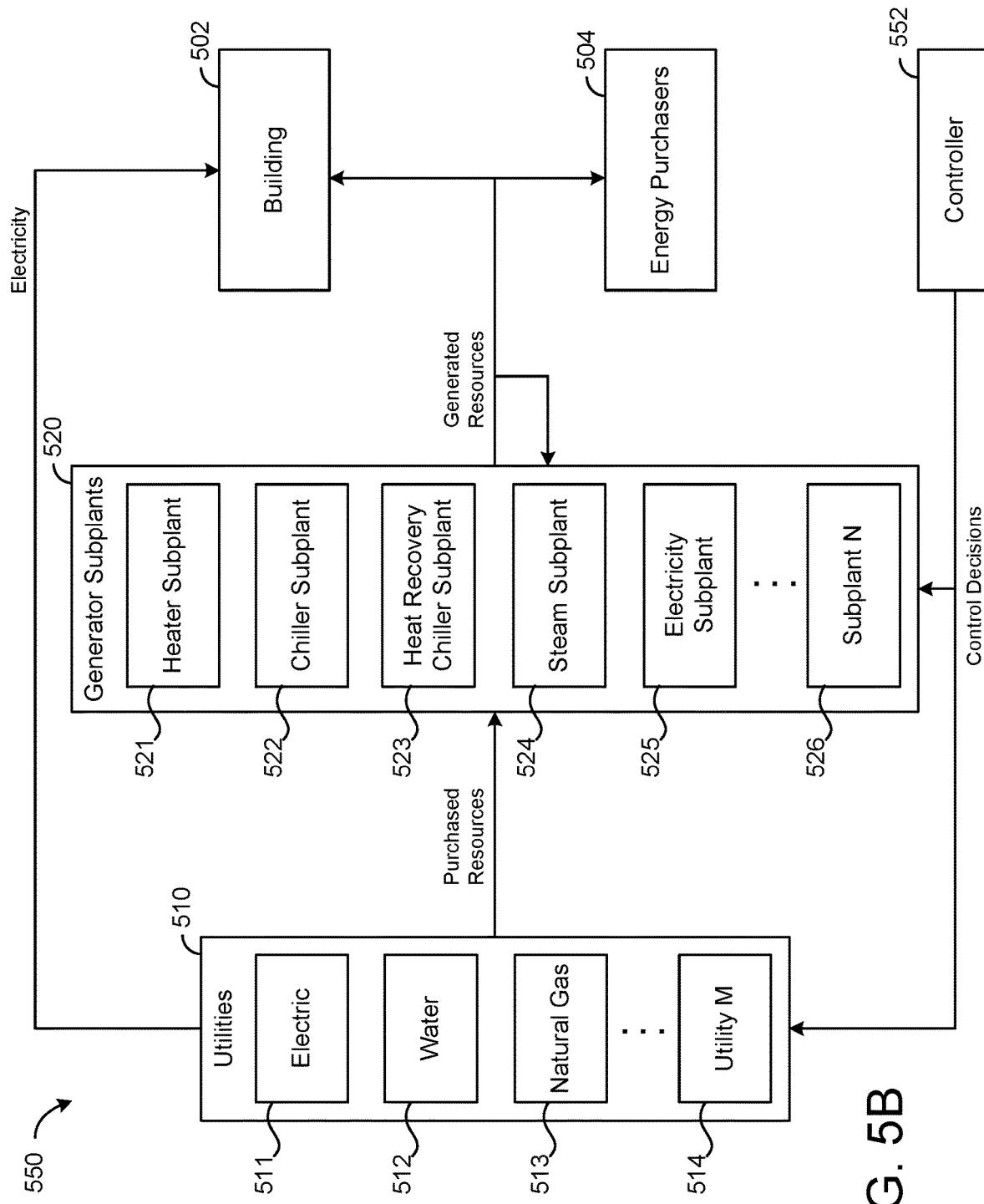
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG. 5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include a plurality of utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 can be configured to convert one or more input resources into one or more output resources by operation of the equipment within generator subplants 520. For example, heater subplant 521 can be configured to generate hot thermal energy (e.g., hot water) by heating water using electricity or natural gas. Chiller subplant 522 can be configured to generate cold thermal energy (e.g., cold water) by chilling water using electricity. Heat recovery chiller subplant 523 can be configured to generate hot thermal energy and cold thermal energy by removing heat from one water supply and adding the heat to another water supply. Steam subplant 524 can be configured to generate steam by boiling water using electricity or natural gas. Electricity subplant 525 can be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 552. Controller 552 can be configured to control the distribution, production, and usage of resources in system 550. In some embodiments, controller 552 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 552 can be configured to maximize the economic value of operating energy cost optimization system 550 over the duration of the optimization period. The economic value may be defined by a value function that expresses economic value as a function of the control decisions made by controller 552. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 552 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 552.

In some embodiments, one or more of subplants 520 includes a subplant level controller configured to control the equipment of the corresponding subplant. For example, controller 552 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 552 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
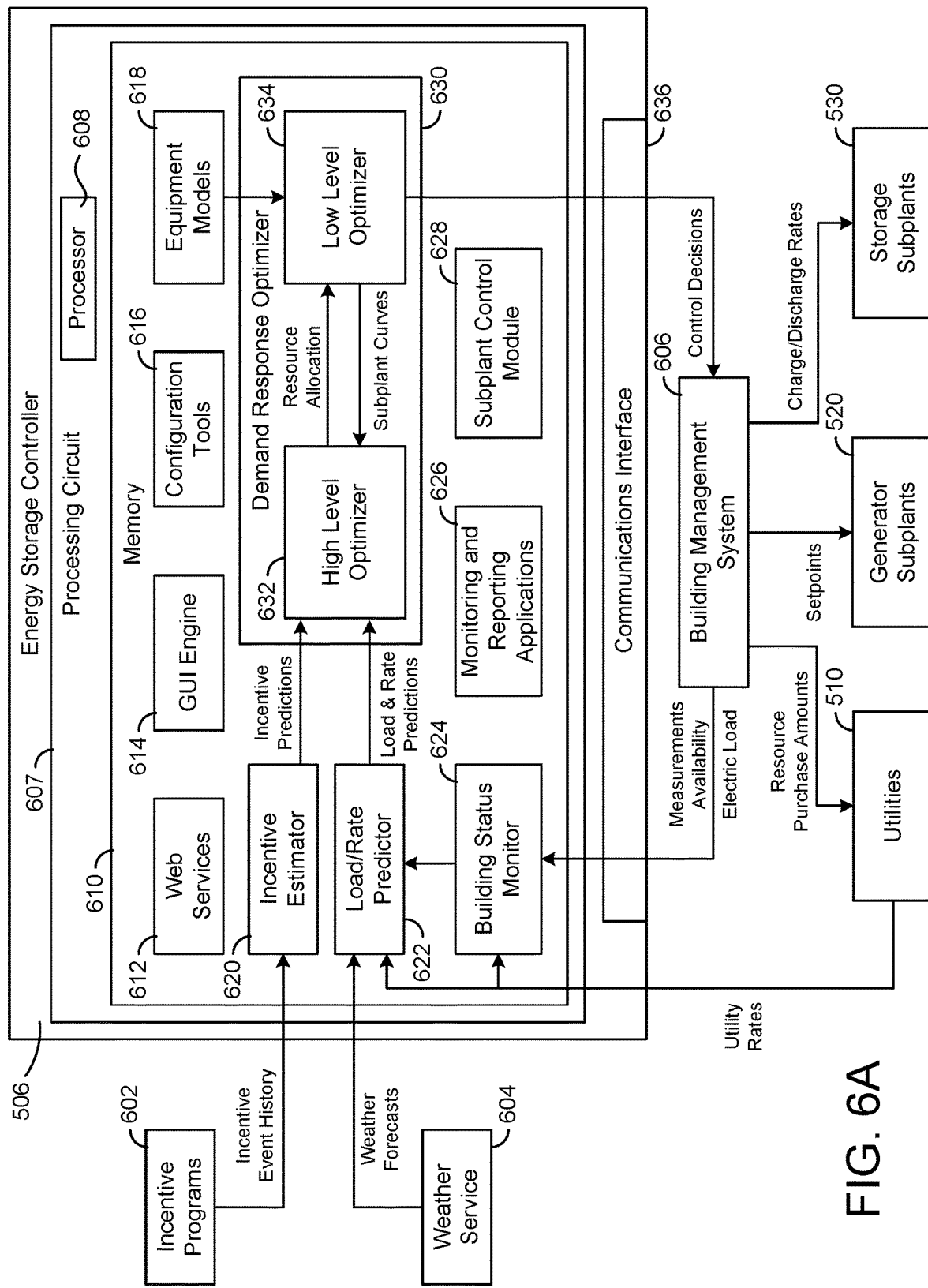
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 can be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 can be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may be integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 can be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 can be configured to predict the thermal energy loads ($\hat{l}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{l}_k$ as a function of the weather forecasts. In some embodiments, load/rate predictor 622 uses feedback from BMS 606 to predict loads $\hat{l}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$ and a cold water load $\hat{l}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 can be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6A, memory 610 is shown to include an incentive estimator 620. Incentive estimator 620 can be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 can be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) can be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 can be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 can be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
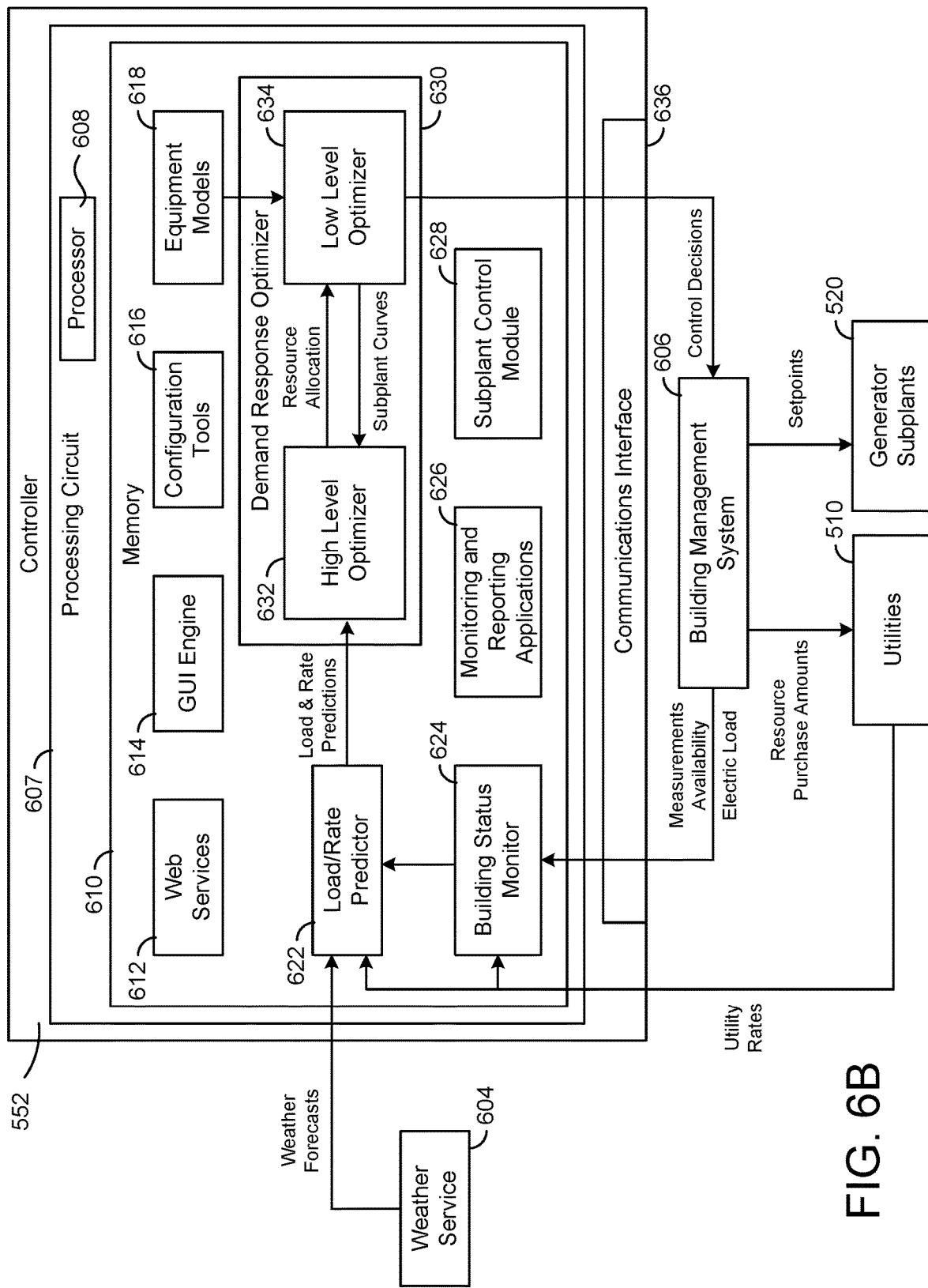
FIG. 6B is a block diagram of a controller which may be used to operate the energy cost optimization system of FIG. 5B, according to an exemplary embodiment.

Referring now to FIG. 6B, a block diagram illustrating controller 552 in greater detail is shown, according to an exemplary embodiment. Controller 552 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 can be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 552. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 552 specifying on/off states and/or setpoints for the subplant equipment. BMS 606 may control the equipment (e.g., via actuators, power relays, etc.) in accordance with the control signals provided by controller 552. For example, BMS 606 may operate the equipment using closed loop control to achieve the setpoints specified by energy storage controller 552. In various embodiments, BMS 606 may be combined with controller 552 or may be part of a separate building management system. According to an exemplary embodiment, BMS 606 is a METASYS® brand building management system, as sold by Johnson Controls, Inc.

Controller 552 may monitor the status of the controlled building using information received from BMS 606. Controller 552 can be configured to predict the thermal energy loads (e.g., heating loads, cooling loads, etc.) of the building for plurality of time steps in an optimization period (e.g., using weather forecasts from a weather service 604). Controller 552 may generate control decisions that optimize the economic value of operating system 550 over the duration of the optimization period subject to constraints on the optimization process (e.g., energy balance constraints, load satisfaction constraints, etc.). The optimization process performed by controller 552 is described in greater detail below.

Controller 552 is shown to include a communications interface 636 and a processing circuit 607 having a processor 608 and memory 610. These components may be the same as described with reference to FIG. 6A. For example, controller 552 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 552 may be the same as previously described with reference to FIG. 6A.

Planning Tool

Figure 7:
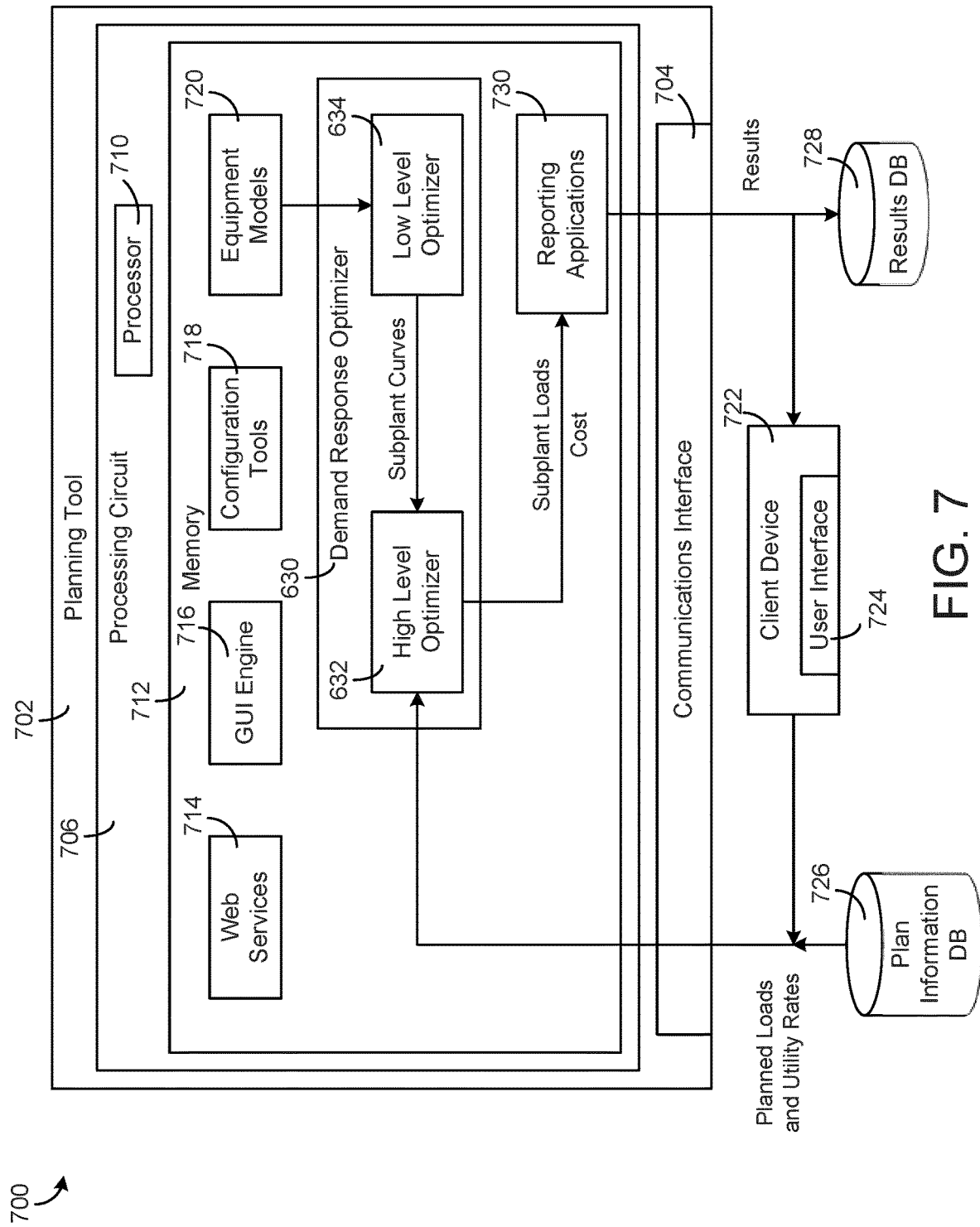
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 can be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 can be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 can be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) can be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
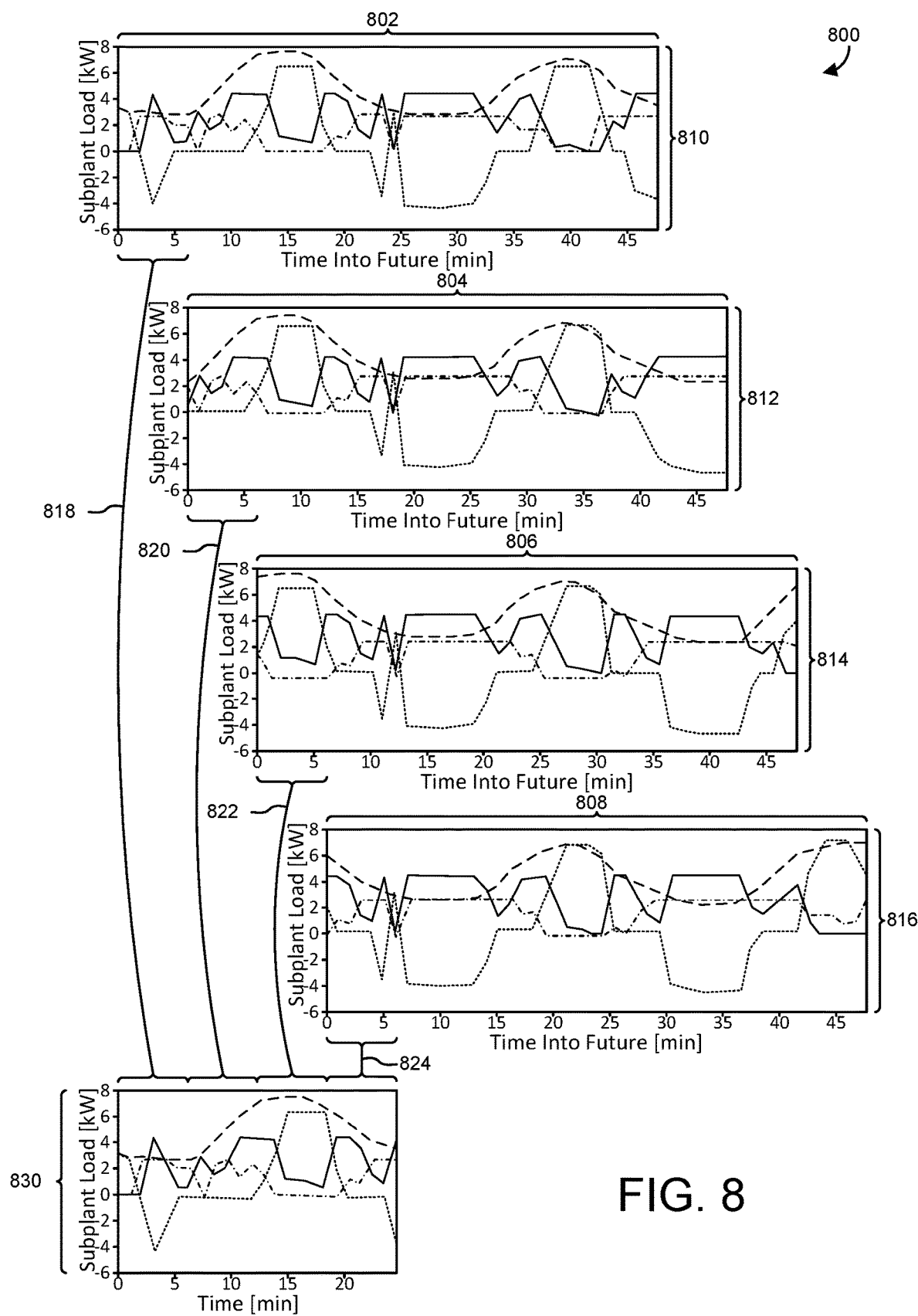
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
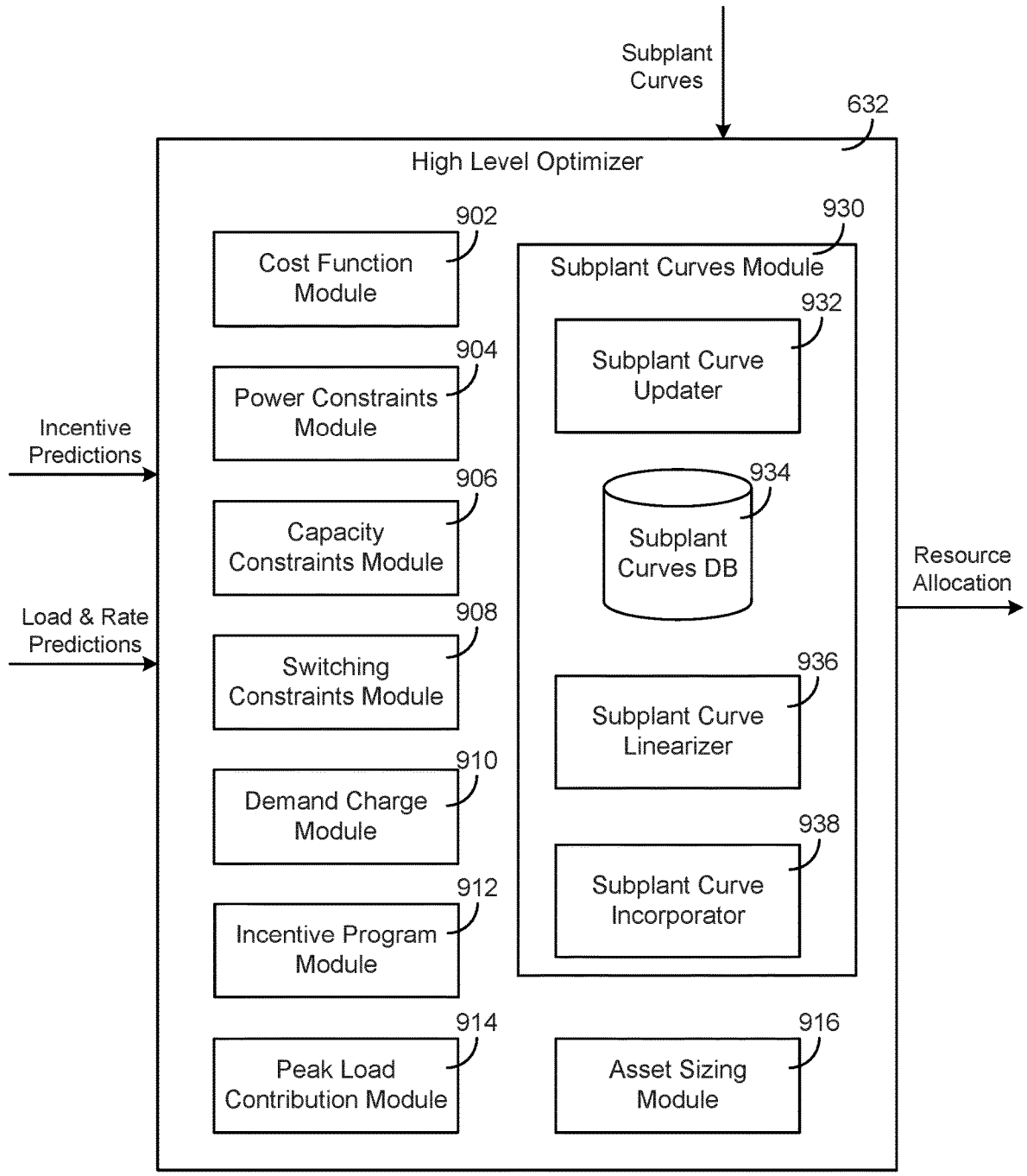
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 552, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\operatorname*{argmin}_{x} J(x)$$

where J(x) is defined as follows:

$$J(x) = \sum_{sources} \sum_{horizon} \text{cost}(purchase_{resource,time}, time) - \sum_{incentives} \sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} purchase_{resource,time} + \sum_{subplants} produces(x_{internal,time}, x_{external,time}, v_{uncontrolled,time}) - \sum_{subplants} consumes(x_{internal,time}, x_{external,time}, v_{uncontrolled,time}) + \sum_{storages} discharges_{resource}(x_{internal,time}, x_{external,time}) - \sum_{sinks} requests_{resource} = 0 \ \forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources} \left[ \sum_{q \in demands_s} w_{demand,s,q} r_{demand,s,q} \max_{i \in demands_{s,q}} (purchase_{s,i}) + \sum_{horizon} r_{s,i} purchase_{s,i} \right] - \sum_{incentives} \sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $purchase_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} |P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 can be configured to impose one or more power constraints on the objective function J(x). In some embodiments, power constraints module 904 generates and imposes the following constraints:

$$P_{bat_i} + P_{FR_i} \leq P_{eff}$$

$$-P_{bat_i} + P_{FR_i} \leq P_{eff}$$

$$P_{bat_i} + P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff} = P_{rated} - P_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 can be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR} P_{FR_i} \\ \qquad\qquad\qquad\qquad\qquad\qquad \forall\ i = k\ \ldots\ k+h-1 \\ C_a - \sum_{n=k}^{i} P_{bat_n} \geq C_{FR} P_{FR_i} \end{cases}$$

$$\begin{cases} C_a - \sum_{n=k}^{i} P_{bat_n} \leq C_{eff} - C_{FR} P_{FR_{i+1}} \\ \qquad\qquad\qquad\qquad\qquad\qquad \forall\ i = k\ \ldots\ k+h-2 \\ C_a - \sum_{n=k}^{i} P_{bat_n} \geq C_{FR} P_{FR_{i+1}} \end{cases}$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff} - C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff} - C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff} - C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff} - C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff} = (1 - C_{FR} - 2C_{socCM})C_{rated} - C_{PV\ FirmingReserve}$$

where $C_{socCM}$ is the control margin and $C_{PV\ FirmingReserve}$ is the capacity reserved for photovoltaic firming.

Still referring to FIG. 9, high level optimizer 632 is shown to include a switching constraints module 908. Switching constraints module 908 can be configured to impose one or more switching constraints on the cost function J(x). As previously described, the cost function J(x) may include the following switching term:

$$\sum_{i=k}^{k+h-1} r_{s_i} |P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$

$$\forall i = k \ldots k+h-1$$

$$s_i > P_{bat_{i-1}} - P_{bat_i}$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time-of-use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 can be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demands_{s,q}} (purchase_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demand_{s,q}} (g_{s,q,i} purchase_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ $\forall$i=1, 2, 3, 8, 9, 10) and active during time steps i=4, 5, 6, 7, 11, 12 (i.e., $g_{s,q,i}=1$ $\forall$i=4, 5, 6, 7, 11, 12). Accordingly, the term $g_{s,q,i}purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

$$J(x) = \ldots + w_{d_1} r_{d_1} \max_i(g_{1_i}(-P_{bat_i} + eLoad_i)) + \\ \ldots + w_{d_q} r_{d_q} \max_i(g_{q_i}(-P_{bat_i} + eLoad_i)) + \\ \ldots + w_{d_N} r_{d_N} \max_i(g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge q. In the case of the previous example, this will result in N auxiliary variables $d_1$ . . . $d_N$ being introduced as decision variables in the cost function J(x). Demand charge module 910 can modify the cost function J(x) to include the linearized demand charge terms as shown in the following equation:

$$J(x) = +w_{d_1}r_{d_1}d_1 + \ldots + w_{d_q}r_{d_q}d_q + \ldots + w_{d_N}r_{d_N}d_N$$

Demand charge module 910 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall\, i = k \ldots k+h-1, \quad g_{1_i} \neq 0$$
$$d_1 \geq 0 \qquad \vdots$$
$$d_q \geq g_{q_i}(-P_{bat_i} + eLoad_i) \quad \forall\, i = k \ldots k+h-1, \quad g_{q_i} \neq 0$$
$$d_q \geq 0 \qquad \vdots$$

-continued $$d_N \geq g_{N_i}(-P_{bat_i} + eLoad_i) \quad \forall\, i = k \ldots k+h-1, \quad g_{N_i} \neq 0$$

$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 ... 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 ... 3), where $g_q$ includes an element for each time step of the optimization period (i.e., $g_q = [g_{q_1} \ldots g_{q_{24}}]$). The three demand charge masks can be defined as follows:

$$g_{1_i} = 1 \quad \forall i = 1 \ldots 24$$

$$g_{2_i} = 1 \quad \forall i = 12 \ldots 18$$

$$g_{3_i} = 1 \quad \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3} \left( eLoad_p - P_{bat_p} - \sum_{l=1}^{4} \frac{e_{lp}}{4} \right) - (eLoad_i - P_{bat_i}) \right) \right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i / r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., $) and $r_{PLC}$ is the rate at which the customer is charged for its PLC (e.g., $/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function $J(x)$. For example, the cost function $J(x)$ may include terms corresponding to energy cost, multiple demand charges, PLC charges, and/or IBDR revenue, as previously described. Adding one or more new assets may affect the values of some or all of these terms in the original cost function $J(x)$. For example, adding a battery asset may increase IBDR revenue and decrease energy cost, demand charges, and PLC charges. However, the original cost function $J(x)$ may not account for the fixed and marginal costs resulting from new asset purchases. In order to account for these fixed and marginal costs, asset sizing module 916 may add new terms to the original cost function $J(x)$.

Asset sizing module 916 can be configured to augment the cost function $J(x)$ with two new terms that correspond to the cost of purchasing the new assets, resulting in an augmented cost function $J_a(x)$. The additional terms are shown in the following equation:

$$J_a(x) = J(x) + c_f^T v + c_s^T s_a$$

where $J(x)$ is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 can be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 can be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 can be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 can be configured to break the subplant curves into piecewise linear segments that combine to form a piecewise-defined convex curve. Subplant curve linearizer 936 may store the linearized subplant curves in subplant curves database 934.

Subplant curve incorporator 938 can be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Energy Storage System (ESS) Charging and Discharging with Dynamic Load Prediction Model Training Referring generally to FIGS. 10-16 systems and methods for controlling the charging and discharging of an energy storage system (ESS) 1026 are shown, according to various exemplary embodiments. In some embodiments, the ESS 1026 is electrical energy storage configured to charge and/or discharge (e.g., batteries, capacitors, etc.). However, in some embodiments, the ESS 1026 stores energy via heated thermal storage e.g., any of the storage supplants 530 as described with reference to FIG. 5A. The ESS 1026 can include one or multiple pieces of equipment for storing energy in various ways. The ESS 1026 can be centralized and/or can be distributed energy storage (DES). In some embodiments, ESS 1026 may be an elevated retention pond with a pumped configured to pump water into the retention pond to store energy and operate a thermoelectric dam to allow the water to drain from the retention pond while generating energy.

Load/rate predictor 622, as described with reference to FIG. 6 and elsewhere herein, is configured to receive various inputs, such as weather data from weather service 604 in some embodiments. Based on the received inputs, load/rate predictor 622 is configured to predict a load and/or rate for a future time and/or times and send the predictions to high level optimizer 632, in some embodiments. High level optimizer 632 is described with greater detail in FIG. 6 and elsewhere herein. Based on the predicted loads and/or rates, high level optimizer 632 can be configured to cause the ESS 1026 to charge and/or discharge energy by generating charging and/or discharging schedules via an optimization with an objective function, various constrains, and/or the predicted loads and/or rates.

Load/rate predictor 622 can be configured to determine whether a current load and/or rate model is unreliable, e.g., the model needs to be retrained. In response to determining to retrain the model, the load/rate predictor 622 can be configured to select data to train a new model (e.g., generate and train a new model, retrain an existing model, etc.). Thus, the models are capable of changing dynamically and adapting over time based on factors e.g., season, building age, occupancy patterns, etc. High level optimizer 632 can be configured to perform an optimization function capable of determining an optimized schedule for charging and discharging the ESS 1026 based on predictions for load and/or rate from the dynamic load and/or rate models, in some embodiments.

Dynamic Load Model Training

Figure 10:
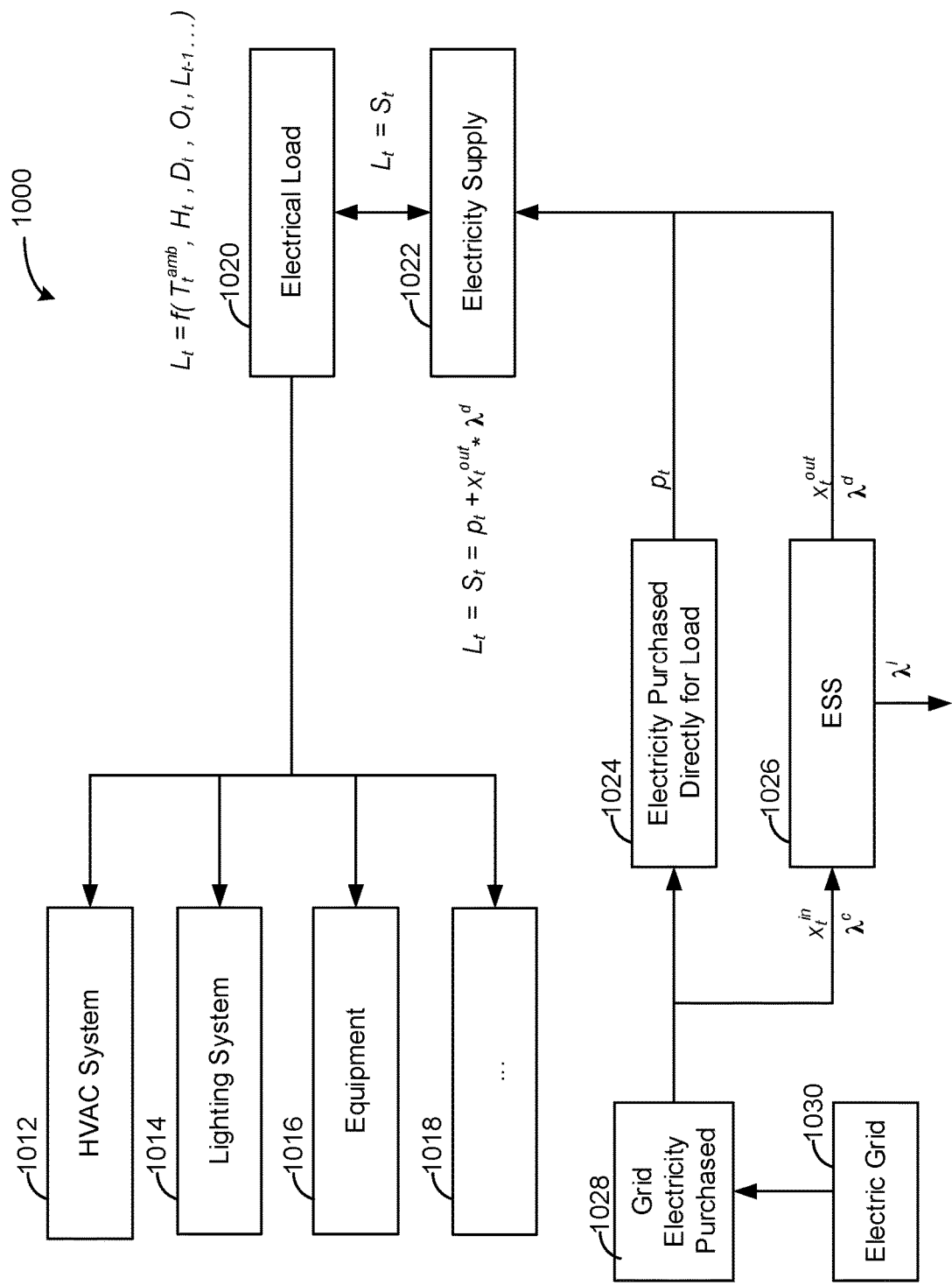
FIG. 10 is a block diagram of a system for charging and discharging an energy storage system (ESS), according to an exemplary embodiment.

Referring now to FIG. 10, a system 1000 is shown configured to charge and/or discharge the ESS 1026, according to an exemplary embodiment. The system 1000 is shown to include an electric grid 1030 that provides electricity to a building (e.g., the campus 102 as described with reference to FIG. 1), equipment (e.g., HVAC systems, lighting systems, etc.), and/or the ESS 1026. Electric grid 1030 may be, for example, an electric grid operated by a utility company. In some embodiments, the systems and methods described with reference to FIGS. 10-16 can consume various other energy sources from the utility company, e.g., gasoline, propane, or other sources of energy and utilize the energy to charge and/or discharge the ESS 1026 and/or power the building and/or equipment.

The system 1000 is shown to include grid electricity purchased 1028. Grid electricity purchased 1028 may be a quantity of electrical energy purchased from electric grid 1030 by the campus 102. Quantities of grid electricity purchased 1028 may be consumed directly by an electrical load 1020, which is represented by electricity purchased directly for load 1024. In some embodiments, all and/or part of grid electricity purchased 1028 may be stored in ESS 1026. In some embodiments, ESS 1026 is configured to store and/or discharge energy. ESS 1026 may be and/or include, for example, a battery, multiple batteries, a capacitor, a capacitor bank, etc. but may also be non-electrical energy storage systems (e.g., the storage subplants 530 as described with reference to FIG. 5A).

Electricity supply 1022 represents the total amount of energy used for electrical load 1020. Electrical load 1020 is the electrical load of campus 102 (e.g., various energy consuming systems of campus 102). Electricity supply 1022 can be a quantity of electricity supplied to be used as electrical load 1020, the quantity purchased from electric grid 1030 and/or discharged from ESS 1026 (e.g., electricity discharged multiplied by a discharging efficiency rate). Electrical load 1020 may be expressed, for example, in terms of kilowatt (KW) or kilovolt-ampere (kVA). Electrical load 1020 may also be expressed in terms of energy consumed by a building (e.g., kWh). Electrical load 1020 may be made up of loads of various systems, e.g., HVAC system 1012, lighting system 1014, and/or equipment 1016. Electrical load 1020 is equal to an electricity supplied 1022. Grid electricity purchased 1028 is equal to electricity purchased directly for the electrical load 1024 and/or ESS 1026 electricity charged divided by a charging efficiency rate.

HVAC system 1012 may be the heating, ventilation, and air conditioning units of a building. HVAC system 1012 may also include a thermostat, a control panel, fans, furnaces, air purifiers, ultraviolet lamps, humidifiers, and/or evaporator coils. The HVAC systems 1012 can be and/or include generator subplants 520 as described with reference to FIG. 5A. Examples of HVAC systems and devices can be found in U.S. patent application Ser. No. 15/926,314 filed Mar. 20, 2018, the entirety of which is incorporated by reference herein. Lighting system 1014 may include various lights that create an electrical load in a building. These lights may be, by way of example, light-emitting diodes (LED), incandescent lightbulbs, fluorescent lightbulbs, etc. Equipment 1016 may be typical equipment that may create an electrical load, such as food refrigerators, computers, televisions, telephones, etc. These are only some possible loads, and the loads of a building may be any equipment of a building that consumes electrical energy.

Block 1018 may be other loads. For example, a business may wish to have an outlet in a parking structure for an electrically powered vehicle. Examples of charging systems for electrically powered vehicles can be found in U.S. Patent Application No. 62/617,011 filed Jan. 12, 2018, the entirety of which is incorporated by reference herein. The sum of the electrical loads created by HVAC system 1012, lighting system 1014, equipment 1016, and block 1018 equals electrical load 1020.

Electrical load 1020, represented as $L_t$, equals electricity supply 1022, represented as $S_t$:

$$L_t = S_t$$

Both $L_t$ and $S_t$ can be expressed in units of electrical energy (e.g., kWh). Electricity supply 1022 is equal to the sum of electricity purchased directly for the load 1024, represented as $p_t$, and ESS 1026 discharge, represented as $x_t^{out}$, multiplied by a discharging efficiency, represented as $\lambda^d$:

$$L_t = S_t = p_t + (x_t^{out} \cdot \lambda^d)$$

ESS 1026 is also shown to have a self-discharge rate, $\lambda_l$. Self-discharging is a natural reaction that occurs in storage systems, e.g., self-discharge of batteries, cooling of hot water, warming of cold water, etc. An amount of grid electricity purchased 1028 may be lost relative to the self-discharge rate.

Grid electricity purchased 1028 equals the sum of $p_t$ and ESS 1026 charge $x_t^{in}$ divided by the charge efficiency, $\lambda^d$, which represents how efficiently ESS 1026 charges (accounts for loss in charging):

$$p_t + \frac{x_t^{in}}{\lambda^c}$$

The cost of grid electricity purchased 1028 is equal to the sum of a time-of-use cost, $C_t^{TOU}$ (normally expressed in units of $/kWh), and the demand charge, $C_t^{DC}$ (normally expressed in units of $/kW). Time-of-use cost is a variable price based on the time-of-day electricity is being purchased. Demand charge is a price based on the maximum power of electricity used in a fixed period (a day or month, etc.). While these two pricing schemes are described in detail in the present invention, they are not limiting. Some embodiments can be configured to calculate the cost of electricity purchased based on other pricing schemes and/or programs (e.g., ELDR, Frequency Response, etc.) ELDR is described in greater detail in U.S. patent application Ser. No. 15/616,616 filed Jun. 7, 2017, U.S. patent application Ser. No. 15/974,443 filed May 8, 2018, and U.S. patent application Ser. No. 15/974,411 filed May 8, 2018, the entirety of these applications is incorporated by reference herein.

Load/Rate Predictor

Figure 11:
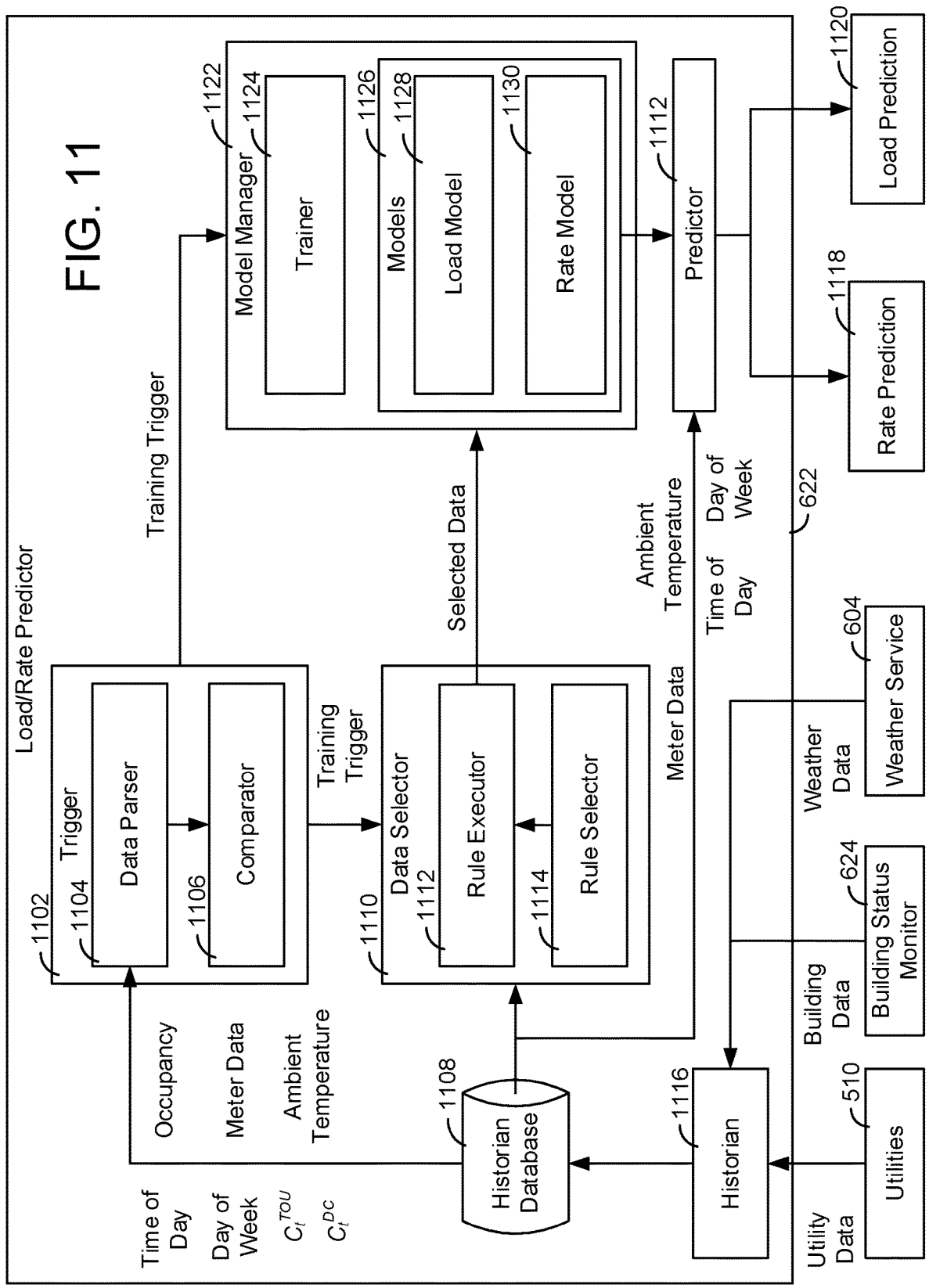
FIG. 11 is a block diagram of a load/rate predictor for generating a prediction of a load and a prediction of a rate, according to an exemplary embodiment.

Referring now to FIG. 11, load/rate predictor 622 of FIG. 6 is shown in greater detail, according to an exemplary embodiment. Load/rate predictor 622 may be implemented via energy storage controller 506, controller 552, a model manager 1122, or any other computing device as described herein. Load/rate predictor 622 may be used to predict an electrical load of a building (e.g., campus 102). Load/rate predictor 622 may be used to predict electric rates, but could also be used to predict other energy-related rates, such as, for example, the price of gasoline, water, or propane. Load/rate predictor 622 can be configured to receive inputs from, for example, utilities 510, building status monitor 624, and weather service 604. Load/rate predictor 622 can be configured to use the received data to determine predicted load and/or rate. Load/rate predictor 622 may include various subcomponents, such as a historian 1116, a historian database 1108, a trigger 1102, a data selector 1110, a model manager 1122, and a predictor 1112.

Data can be received by historian 1116, and sent to historian database 1108. Historian database 1108 can be configured to send the received data to trigger 1102. Trigger 1102 can be configured to determine whether to generate a new model (e.g., models 1126) and/or retrain an existing model (e.g., models 1126). Historian database 1108 can also be configured to send data to data selector 1110. Upon receiving a signal from trigger 1102, data selector 1110 can be configured to select data for a new model. Model manager 1122 can be configured to receive a signal from trigger 1102 indicating whether to generate a new model and can be configured to receive a data from data selector 1110. Model manager 1122 can be configured to send load and/or rate models to predictor 1112, which can be configured to determine outputs of the models based on, for example, data received from historian database 1108.

Trigger 1102 can be configured to determine whether to generate a new model, e.g., models 1126, for predicting a load value and/or a rate value. In the exemplary embodiment shown, trigger 1102 receives historical data from historian database 1108 through data parser 1104 and causes model manager 1122 to generate, train, and/or retrain a model.

Trigger 1102 is shown to include data parser 1104 and comparator 1106. Data parser 1104 can be configured to parse a segment of data to send to comparator 1106. Comparator 1106 can be configured to compare the parsed segment of data to data utilized by a current model and determines whether a new model should be generated. For example, if the data utilized by a current model is from the summer months, and it is now winter, it may be desirable to create a new model based on more current data (e.g., the past few days or weeks). Data parser 1104 could be configured to parse only a few days of weather data in the summer months, but parse a few weeks of weather data in the winter months. If the weather data varied by a predetermined amount from the weather data in the current model, comparator 1106 could send a signal to model manager 1122 and/or data selector 1110, signaling a new model based on a new data set should be generated and/or an existing model should be retrained.

Other possible triggers for creating a new model may include, but are not limited to, changes in occupancy and load. Data parser 1104 can be configured to receive occupancy data indicating a number of occupants for particular times (e.g., days, weeks, years). Comparator 1106 can be configured to receive a segment of occupancy data from data parser 1104 and determine whether occupancy has increased or decreased by a predefined amount over a period of time. Trigger 1102 can be configured to send a signal to model manager 1122 indicating a new model should be trained in response to the change in occupancy. An example of an occupancy change trigger could be the number of people in a school building (i.e., the occupancy of a building) dropping during spring break. Fewer occupants likely correlate with less load.

Similarly, data parser 1104 can be configured to receive load pattern data indicating an electrical load for a building for particular times. Comparator 1106 can be configured to receive a segment of load data from data parser 1104 and determine whether load pattern data has increased or decreased by a predefined amount over a period of time. Trigger 1102 can be configured to send a signal to model manager 1122 indicating a new model should be trained in response to the change in load pattern. An example of a change in load pattern trigger could be that LED lighting was recently installed replacing old inefficient lighting. LED lighting likely consumes less energy, thus changing the load pattern. A trigger could be a combination of changes in different data. For example, a reduction in occupancy often percent and a change in time of eight hours may represent that a business day is coming to a close, which may correlate with a lower load in coming hours. In some embodiments, other data may be similarly used. For example, an increase or decrease in electricity pricing may trigger a new comparator 1106 to send a signal to generate a new model. It may be the case that power company's prices are actually indicative of future loads.

In some embodiments, different types of data may be segmented separately by data parser 1104. While occupancy may change as the business day comes to a close, temperature may remain steady for several hours until nighttime arrives. Thus, it may be useful to segment a period of several hours for temperature to send to comparator 1106 while using a shorter period for occupancy. In some embodiments, data parser 1104 can be configured to receive manual parsing instructions from a user. Data parser 1104 can be configured to perform the manual parsing instructions and segment data accordingly. Comparator 1106 can also be configured to receive manual compare instruction from the user. Comparator 1106 can be configured to compare the segment of data accordingly.

Load/rate predictor 622 can be configured to select data to be used to generate a new model via data selector 1110. Data selector 1110 can be configured to receive data from historian database 1108, and a signal indicating to select new data from trigger 1102. Rule selector 1114 can be configured to select rules for determining (selecting) data to use in a new model. Rule executor 1112 can be configured to execute the selected rules and output selected data based on the executed rules to model manager 1122. During winter months, for example, it may be desirable to use the last several weeks of weather data because weather is likely steady (e.g., environmental conditions are within a predetermined range). However, in early spring, when temperatures may vary substantially, it may be desirable to use only weather data from the past few days. Data selector 1110 may also select data based on occupancy. On Christmas Day, using occupancy data from Christmas Day of a previous year and/or years may be desirable. Using a full week of data may predict an occupancy that is too high. Yet, during the month of February, when there are no holidays, an average of occupancy during business weeks for the past several business weeks may be desirable.

The load/rate predictor 622 can be configured to generate a load and rate model via model manager 1122. In some embodiments, the electrical load 1020,$L_t$, (as described with reference to FIG. 11) may be modelled by a function:

$$L_t = f(T_t^{amb}, H_t, D_t, O_t, L_{t-1}, \ldots)$$

The variables above may correspond to the following:
$T_t^{amb}$=temperature of ambient air
$H_t$=hour of the day at t
$D_t$=day of the week
$O_t$=occupancy
$f(\ )$ is the load prediction model (e.g., the model 1128)

The above equation is meant to be representative of various data inputs for modelling a load. Some models may place more weight on one variable than others. Furthermore, a similar model can be utilized for the rate model 1130 which may take into account (and/or can be trained on historical) past prices and/or current prices (e.g., $C_t^{TOU}$ and/or $C_t^{DC}$), current date, time, weather conditions, etc.

The load and rate models 1128 and 1130 may be used to predict a load and/or rate for some time, t (or multiple times into the future), via predictor 1112. Predictor 1112 can be configured to send rate prediction 1118 and/or load prediction 1120 to demand response optimizer 630, high level optimizer 632, cost minimizer 1202, constraint setter 1208, horizon scheduler 1206, and/or any other computing device or software component that can operate the campus 102 via the rate prediction 1118 and/or 1120. Rate prediction 1118 and/or load prediction 1120 can also be stored by the load/rate predictor 622.

The load/rate predictor 622 can receive data from various sources (e.g., utilities 510, building status monitor 624, and weather service 604), including an amount of load information, electricity usage, weather data, occupancy data, current time, current day, etc. The data from utilities 510, building status monitor 624, and weather service 604 may be sent to historian 1116 and then stored in historian database 1108.

In some embodiments, trigger 1102 may use a running average of data. Data parser 1104 may create a running average of data, such as, for example, occupancy. When the slope of the running average became too low or two high relative to a period of time, comparator 1106 can be configured send a training trigger signal to data selector 1110 and/or model manager 1122.

Data selector 1110 can be configured to select data to use in new models for load and/or rate used by model manger 1122. Data selector 1110 may include rule selector 1114, which selects rules for selecting data to use in new models, and rule executor 1112, which receives data from historian database 1108 and executes the selected rules. In some embodiments, rule selector 1114 may work similarly to data parser 1104. As an example, rule selector 1114 may include a rule to use only occupancy data, for example, from a previous business day around the same time. Data for the previous business day around the same time would then be parsed in rule executor 1112.

In some embodiments, rule selector 1114 is configured to store a look-up table that includes predefined conditions and predefined selection periods of data for each predefined condition. Rule selector 1114 can select one of the rules of the look-up table based on various conditions (e.g., the historical data of the historical database 1108, current occupancy levels, changes in occupancy levels, current date, current temperature, changes in temperature, etc.) Rule executor 1112 can be configured to receive the selected rule from rule selector 1114 and use received data from historian database 1108 and the look-up table to determine the selected data for model manager 1122 to utilize in training the models 1126.

For example, rule selector 1114 can identify that ambient temperature has dropped by a predefined amount over a previous week. One of the rules of the look-up table may indicate to select the two previous weeks of historical data of the historical database 1108 to train the models 1126. Rule selector 1114 can provide the identified rule of the look-up table to rule executor 1112. Rule executor 1112 can select the two previous week of data from historical database 1108 can provide the selected data to model manager 1122.

As another example, one of the rules of the look-up table may be a particular date (e.g., July $1^{st}$). For a school, occupancy may fall during summer months due to the absence of students, this may correspond to a lower load. In response to determining that a current data is July $1^{st}$, rule selector 1114 may select the July $1^{st}$ rule of the look-up table which may have a specific condition (e.g., use the data from June and/or from one or more previous summers) to train the models 1126. Based on the July $1^{st}$ rule selected by rule selector 1114, rule executor 1112 can be configured to select data for use in training models 1126 based on the condition of the July $1^{st}$ rule.

In some embodiments, rule selector 1114 may select a rule to receive current data, create averages of the current data, then check which average is closet to a series of periods from historian database 1108 corresponding to a previous day, month, or year. The rule selector 112 can be configured to cause rule executor 1112 to select data with a closet average and provide the selected data to model manager 1122.

Model manager 1122 may include a trainer 1124 and models 1126. Models 1126 may include a load model 1128 and/or a rate model 1130. Load model 1128 can indicate predicted load, $L_t$, which can be predicted via load model 1128 using various variables and/or various model types. The exact model type used may be selected by trainer 1124. For example, if model manager 1122 determines that occupancy data accuracy has fallen (e.g., the BMS determines occupancy sensors are not working or are experiencing a predefined number of faults), the model manager 1122 can be configured to adjust the models 1126 to place less weight on, or disregard, occupancy data. On the other hand, on a holiday (e.g., Christmas Day) at a closed business, occupancy may have a higher certainty, e.g., the level of occupancy may normally be zero. Thus, greater weight may be given to occupancy in a model. The actual model used for load and rate respectively may be stored in load model 1128 and rate model 1130.

In some embodiments, load/rate predictor 622 may use, but is not limited to, various supervised or unsupervised machine learning models. The models may be a generalized additive model (GAM), a Random Forecast (RF), a support vector machine (SVM) model, a generalized linear model (GLM), a nonlinear autoregressive exogenous (NARX), a neural network (e.g., a recurrent neural network (RNN) model (e.g., a long short term memory (LSTM) model), a convolutional neural network (CNN) model, etc.), and/or any other type of suitable prediction model. Trainer 1124 can be configured to select a particular machine learning model (or multiple models) for load model 1128 and/or rate model 1130. The models selected may be the same for rate and load prediction may be the same or different types of models. For example, load model 1128 may use a GAM while rate model 1130 may use a SVM model.

In some embodiments, the determination and/or generation of future predicted loads and rates using the models 1126 is performed by predictor 1112. Predictor 1112 can be configured to receive data from historian database, use it in the models, and output a prediction corresponding to that data. In some embodiments, the models 1126 may have an independent variable of time with a dependent variable of load and/or rate. In such an embodiment, it may not be necessary for predictor 1112 to receive data from historian database 1108. In some embodiments, the predictor 1112 may receive data directly from sources of data (e.g., utilities 510, building status monitor 624, and/or weather service 604).

Optimization of Cost Function

Figure 12:
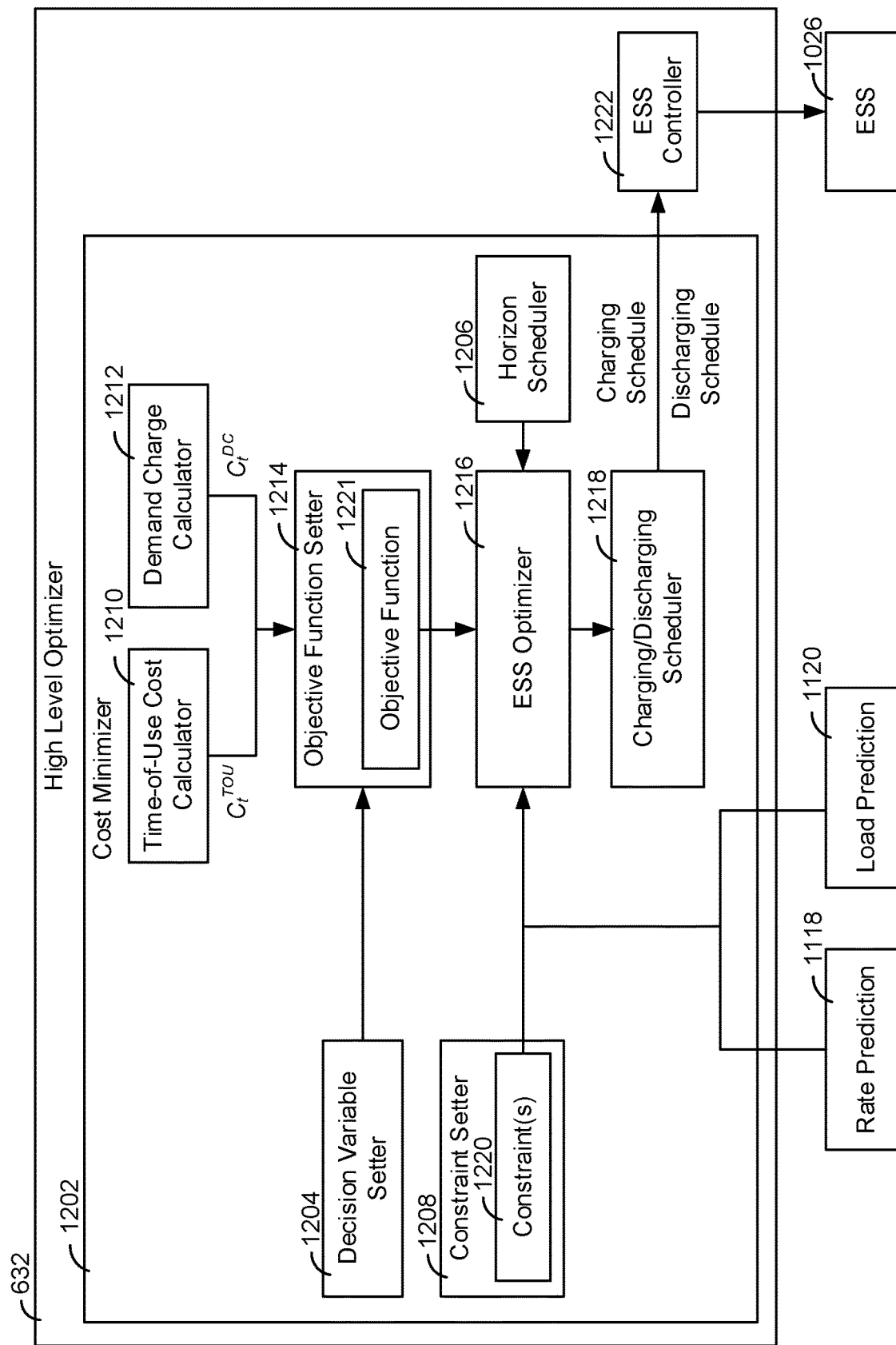
FIG. 12 is a block diagram of the high level optimizer of FIG. 9 optimizing a charging and discharging schedule of the ESS of FIG. 10 based on the prediction of the load and/or the prediction of the rate, according to an exemplary embodiment.

Referring now to FIG. 12, high level optimizer 632 is shown in greater detail configured to perform cost function optimization, according to an exemplary embodiment. High level optimizer 632 is shown to include a cost minimizer 1202 configured to receive rate prediction 1118 and load prediction 1120 as generated by load/rate predictor 622 as described with reference to FIG. 11. Based on rate prediction, 1118, load prediction 1120, and an objective function 1221 and constraints 1220, cost minimizer 1202 can be configured to generate a charging and/or discharging schedule for ESS 1026. Objective function setter 1214 can be configured to store and/or determine objective function 1221 while constraint setter 1208 can be configured to store and/or determine constraints 1220.

The cost function optimization discussed with reference to FIG. 12 may be the same as, or similar to, the cost function described with reference to cost function module 902 of FIG. 9. The cost function optimization discussed with reference to FIG. 12 can be incorporated into the cost function described with reference to FIG. 9 or may be independent of the cost function of FIG. 9.

The goal of cost optimization as performed by the cost minimizer 1202 may be to find settings for variables of ESS 1026 that result in a lowered and/or minimized cost. In some embodiments, objective function 1221 (e.g., a cost minimization function) is:

$$\min_{x_t^{in}, x_t^{out}} \left\{ \sum_{t=1}^{T} \alpha_t C_i^{TOU}\left(p_t + \frac{x_t^{in}}{\lambda^c}\right) + \max_{1 \le t \le T}\left(p_t + \frac{x_t^{in}}{\lambda^c}\right) C_t^{DC} \delta \right\} + \ldots$$

$\alpha_t$ is the relative weight of the time-of-use cost at time t. Various terms for various other incentive programs, e.g., IBDR, Frequency Response, etc. could also be included in objective function 1221.

In objective function 1221, the decision variables can be ESS charge and discharge, $x_t^{in}$ and $x_t^{out}$, respectively. The time-of-use cost, $C_i^{TOU}$, which may have units of $/kWh, is multiplied by the amount of electricity purchased for a period of time. Because demand charge, $C_t^{DC}$, is based on the maximum power used in a given period, the function finds the maximum amount, then multiples the maximum by the demand charge. $\delta$ represents a unit of time used to convert power, kW, to energy, kWh.

Cost minimizer 1202 is shown to include an ESS optimizer 1216 which can be configured to optimize the objective function 1221 based on constraints 1220. The constraints 1220 may be based on the load of the building (e.g., a predicted load). These constraints 1220 may be:

$L_t = p_t + x_t^{out} \cdot \lambda^d$ $L_t = f(T_t^{amb}, H_t, D_t, O_t, L_{t-1}, \ldots)$ The constraints 1220 may be physical constraints of ESS 1206 and/or campus 102 and may be:

$S_t = [S_{t-1} + \delta(x_t^{in} - x_t^{out})](1 - \lambda_t)$ Energy Balance $\delta x_t^{out} \le S_t$ Discharging Limit $x^{in,min} \cdot u_t \le x_t^{in} \le x^{in,max} \cdot u_t$ Charging Bounds $x^{out,min} \cdot u_t \le x_t^{in} \le x^{out,max} \cdot u_t$ Discharging Bounds $S_t^{min} \le S_t \le S_t^{max}$ ESS Storage Bounds $u_t \in \{0,1\}$ Binary Values For $u_t$ $x_t^{in} \ge 0$ Minimum Value of $x_t^{in}$ $x_t^{out} \ge 0$ Minimum Value of $x_t^{out}$ $x_t^{in} \cdot x_t^{out} = 0$ Prevention of Simultaneous Charging and Discharging Other possible constraints could relate to stress placed on, and the life cycle of, ESS 1026. Still another constraint could be that the product of $x_t^{in}$ and $x_t^{out}$ is zero, which would represent that ESS 1026 cannot charge and discharge at the same time (i.e., either $x_t^{in}$ or $x_t^{out}$ is equal to zero). Other possible constraints could operate the same or similarly the constraints utilized by power constraints module 904 and capacity constraint module 906. Table 2 below indicates the decision variables of objective function 1221 while Table 1 indicates the parameters of the constraints 1220, the objective function 1221, and the models 1126 as described with reference to FIG. 11.

TABLE 1

Parameters

| Parameter | Definition | Units |
|---|---|---|
| $S_t$ | Total amount of energy stored in ESS at time t | kWh |
| $\delta$ | Time unit to convert power [kW] to energy [kWh] | Hour |
| $x^{in,min}$ | Minimum charging rate in unit time | kW |
| $x^{in,max}$ | Maximum charging rate unit time | kW |
| $u_t$ | Binary variable indicating on or off status of ESS at time t | Binary |
| $\lambda_l$ | Self-discharge rate of ESS | %/time |
| $\lambda^c$ | Charging efficiency | Percentage |
| $\lambda^d$ | Discharging efficiency | Percentage |
| $\alpha_t$ | Relative weight of TOU cost at time t | None |
| $L_t$ | Electricity load at time t (e.g., load prediction 1120) | kW |
| $p_t$ | Grid power used for load at time t | kW |
| $C_C^{TOU}$ | TOU (time-of-use) charge (e.g., rate prediction 1118) | $/kWh |
| $C_C^{DC}$ | Demand charge (e.g., rate prediction 1118) | $/kW |
| $H_t$ | Hour of a day at time t | None |
| $D_t$ | Day of week | None |
| $O_t$ | Occupancy | None |

TABLE 2

Decision Variables

| Variable | Definition | Units |
|---|---|---|
| $x_t^{in}$ | Power charged by ESS at time t | kW |
| $x_t^{out}$ | Power discharged by ESS at time t | kW |

Still referring to FIG. 12, constraint setter 1208 can be configured to store some and/or all of the constraints described above. Constraint setter 1208 can be configured to implement some and/or all of the constraints 1220 for optimization of objective function 1221. The constraints 1220 implemented by constraint setter 1208 can be sent to ESS optimizer 1216. Constraint setter 1208 may operate the same as and/or similar to power constraints module 904 and capacity constraint module 906 as described with reference to FIG. 9.

Horizon scheduler 1206 can be configured to set a period of time over which the optimization is performed by ESS optimizer 1216. In this regard, the optimization performed by ESS optimizer 1216 can identify charging and/or discharging amounts for ESS 1026 for multiple time steps over the period (e.g., fifteen minute time steps for a 24 hour period). In some embodiments, the period is a minute, an hour, a day, a week, a month, and/or a year. In some embodiments, horizon scheduler 1206 can be configured to receive a selection of the period from a user interface. In some embodiments, the interval and period of the load prediction generated by the load/rate predictor 622 is the same as used by the high level optimizer 632 to perform the optimization.

Decision variable setter 1204 can be configured to set the decision variables for the objective function 1221, which are then sent to objective function setter 1214. In some embodiments, the decision variables are the decisions and/or amounts to charge or discharge ESS 1026, i.e., the decision variable setter 1204 would set $x_t^{in}$ and $x_t^{out}$ as decision variables.

In some embodiments, time-of-use cost calculator 1210 is configured to set the part of objective function 1221 related to time-of-use cost. Time-of-use cost calculator 1210 can be configured to set:

$$\alpha_t C_t^{TOU}\left(p_t + \frac{x_t^{in}}{\lambda^c}\right)$$

Demand charge calculator 1212 may be similarly configured to set the part of the objective function 1221 related to demand cost. In some embodiments, demand charge calculator 1212 could be implemented by demand charge module 910. Demand charge calculator 1212 can be configured to set:

$$\max_{1 \le t \le T}\left(p_t + \frac{x_t^{in}}{\lambda^c}\right)C_t^{DC}\delta$$

ESS optimizer 1216 can be configured to perform an optimization with objective function 1221. The outputs of the optimization may be optimized decision variables, e.g., $x_t^{in}$ and $x_t^{out}$, as set by decision variable setter 1204. The inputs to the ESS optimizer 1216 used to perform the optimization may include rate prediction 1118 and/or load prediction 1120. In some embodiments, rate prediction 1118 and load prediction 1120 may be values for the time steps of the period set by horizon scheduler 1206. ESS optimizer 1216 can perform the optimization with discrete decisions in time intervals, multi-object optimization, linear programming (LP), dynamic programming (DP), Markov decision processes MDP, particle swamp optimization (PSO), genetic algorithm (GA), and/or grid search.

The decision variables may be sent from the ESS optimizer 1216 to charging/discharging scheduler 1218. The charging/discharging scheduler 1218 may store charging/discharging settings for ESS 1026 over a period of time. ESS 1026 can be controlled by ESS controller 1222, which may set a battery or other storage device of ESS 1026 to charge and discharge.

Cloud Based Charging and Discharging Scheduling

Figure 13:
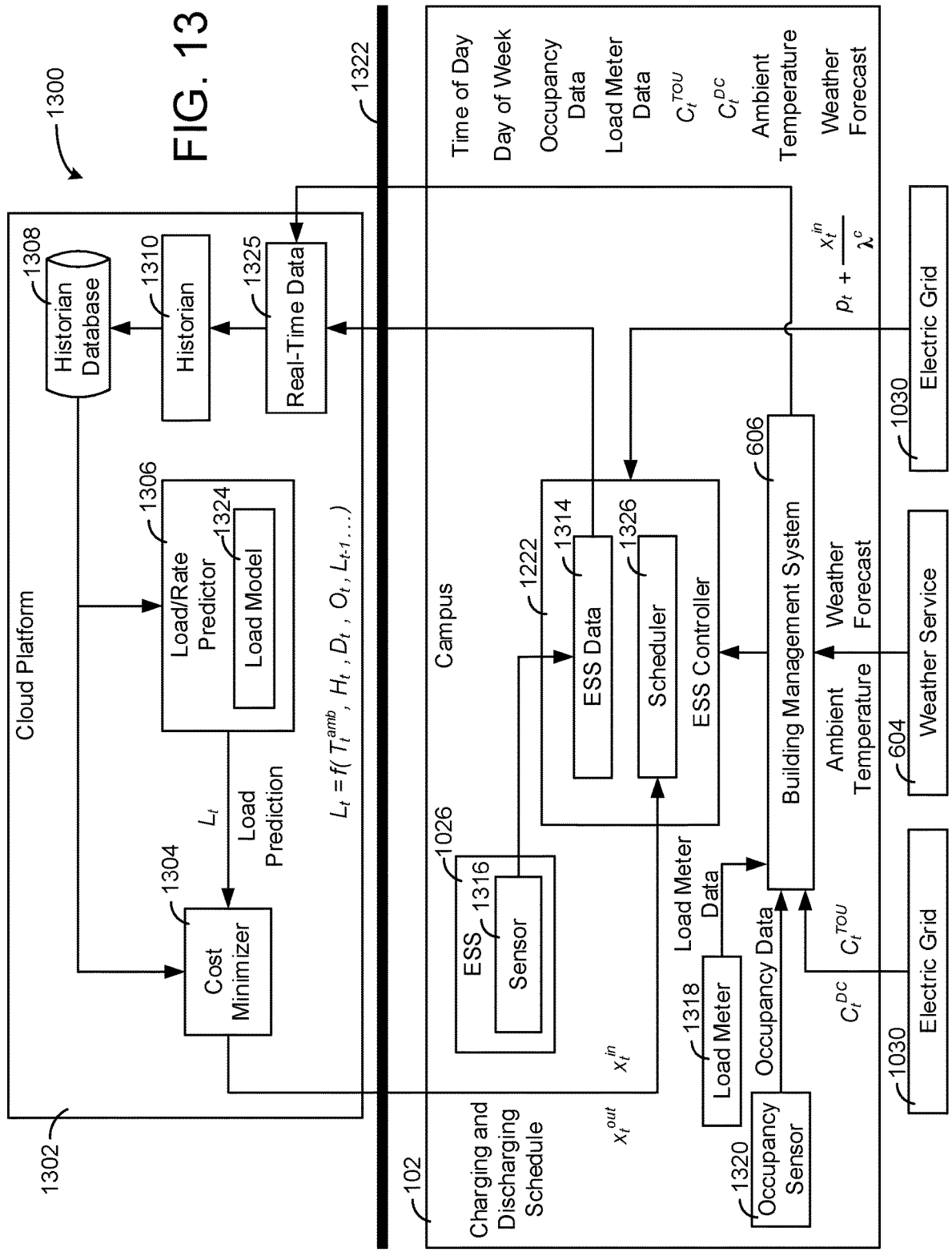
FIG. 13 is a block diagram of a system for charging and discharging the ESS of FIG. 10 based on dynamic load model training in a cloud platform, according to an exemplary embodiment.

Referring now to FIG. 13, a system 1300 is shown including a cloud platform 1302 configured to generate a load prediction and a charging and/or discharging schedule for ESS 1026 based on the load prediction, according to an exemplary embodiment. Utilizing cloud computing, e.g., cloud platform 1302, to perform the generation of the charging and/or discharging schedule may have various advantages over local computing techniques. For example, a company likely only has to pay for storage in the cloud platform 1302 that it actually uses instead of paying for all the hardware required to locally perform the storage. Additionally, cloud storage may reduce the energy costs for a business that would otherwise have to store large amounts of data in an on-premises data center.

Cloud platform 1302 can be one or more computing devices (e.g., one or multiple processing circuits). The computing devices can be servers, server farms, datacenters, databases, and/or any other type of computing or storage system or device. The computing and storage devices may be the same as and/or similar to processing circuit 607, processor 608, and/or memory 610 as described with reference to FIG. 6. Cloud platform 1302 can be a cloud platform such as MICROSOFT AZURE®, or AMAZON WEB SERVICES (AWS)®. Cloud platform 1302 includes a cost minimizer 1304, a load/rate predictor 1306, a historian database 1308, and a historian 1310. Cost minimizer 1304 may be the same and/or similar to cost minimizer 1202 as described with reference to FIG. 12. Load/rate predictor 1306 may be the same as, or similar to, the load/rate predictor 622 as described with reference to FIG. 11 and may include a model manager that may be the same and/or similar to model manager 1122 as described with reference to FIG. 11. Historian database 1308 may be the same and/or similar to historian database 1108 as described with reference to FIG. 11. Furthermore, historian 1310 can be the same and/or similar to historian 1116 as described with reference to FIG. 11.

Campus 102 may include ESS controller 1222 as described with reference to FIG. 12 and building management system 606 as described with reference to FIG. 6. Building management system 606 may receive data such as utility rates (e.g., demand charge, time-of-use charge) and weather data (e.g., ambient temperature) from electric grid 1030 and/or weather service 604 as described with reference to FIG. 6. Furthermore, from various pieces of building equipment (e.g., a load meter 1318, occupancy sensor 1320, etc.) building management system 606 can receive load meter data and/or occupancy data. Load meter 1318 can be configured to measure the load of campus 102 placed on electric grid 1030 (e.g., the amount of electricity consumed by HVAC system 1012, lighting system 1014, and/or equipment 1016 as described with reference to FIG. 10). Occupancy sensor 1320 can be an occupancy sensor and/or a system of occupancy sensors configured to determine whether campus 102, various buildings 116 of campus 102, and/or whether various floors and/or areas of buildings 116 are occupied. Occupancy sensors 1320 can be passive infrared (PIR) occupancy sensors, mobile device based occupancy sensors, an access control based system, and/or any other type of device and/or system configured to determine occupancy.

ESS controller 1222 is shown to receive data (e.g., ambient temperature, weather forecast, demand charge, time-of-use charge) from building management system 606 but can in some embodiments, receive the data directly from electric grid 1030, weather service 604, load meter 1318, and/or occupancy sensor 1320. ESS controller 1222 is further shown to receive ESS data 1314 from ESS 1026. ESS data 1314 may be collected via a sensor or sensors, e.g., sensor 1316 of ESS 1026. The ESS data 1314 may be battery temperatures and/or state-of-charge values of a battery of ESS 1026, and/or any other collected data of ESS 1026.

ESS controller 1222 is shown to be configured to charge ESS 1026 based on electricity supplied by electric grid 1030. The amount of electricity purchased from electric grid 1030 used to charge ESS 1026 can be represented as $$p_t + \frac{x_t^{in}}{\lambda^c}$$

which takes into account the charging loss of ESS 1026. Charging ESS 1026 based on electricity of electric grid 1030 is described in greater detail in FIG. 10.

ESS controller 1222 and/or building management system 606 can be configured to communicate ESS data 1314 and/or the data collected from electric grid 1030, weather service 604, load meter 1318, and/or occupancy sensor 1320 to cloud platform 1302. The data communicated from ESS controller 1222 and/or building management system 606 (or from cloud platform 1302 to ESS controller 1222 and/or building management system 606) can be communicated via network 1322.

Network 1322 can be any type of communication network (e.g., a wired communication network and/or a wireless communication network). Network 1322 can be a local area network (LAN), a metropolitan area network (MAN), and/or a wide area network (WAN) (e.g., the Internet). In some embodiments, network 1322 is a cellular network (e.g., a 2G, 3G, and/or LTE network). Network 1322 can utilize Ethernet cables, RS-485 cables, wireless transmitters and/or receives, network switches, routers, server systems, etc. In some embodiments, network 1322 utilizes various Internet layer protocols, BACnet protocols, CAN protocols, Zigbee protocols, and/or any other type of protocol.

Based on the received data from campus 102 (received via network 1322), cloud platform 1302 can be configured to generate a charging and/or discharging schedule for ESS controller 1222 to operate ESS 1026 based on. Cloud platform 1302 can be configured to receive real-time data 1325 from campus 102 (e.g., time of day, day of week, occupancy data, load meter data, time-of-use cost, demand cost, and/or ambient temperature). The data received from campus 102 may be in the form of a data package. The data package may include a value for time of day, a value for day of week, a value for occupancy, a value for load based on the load meter data, a value for time-of-use cost, and a value for demand cost. In this regard, the data stored in historical database 1308 may also be stored in a similar manner.

Historian 1310 can be configured to add (e.g., append), the real-time data 1325 to historical data of historical database 1308 (e.g., previously received real-time data 1325). The cloud platform 1302 can generate a load prediction and/or a rate prediction and communicate the load prediction to ESS controller 1222. ESS controller 1222 can be configured to determine the charging and/or discharging schedule of ESS 1026 based on the received load prediction and/or rate prediction.

Based on the historical data stored in historian database 1308, load/rate predictor 1306 can train and/or execute load model 1324. Load/rate predictor 1306 can include some and/or all of the functionality of load/rate predictor 622 as described with reference to FIG. 11 such that the load/rate predictor 1306 can be configured to determine whether load model 1324 should be retrained based on changing conditions identified in the data of historian database 1308 (e.g., changes in occupancy, changes in load, etc.) as described with reference to FIG. 11.

The load prediction generated by load model 1324 can be used by cost minimizer 1304 to generate the charging and/or discharging schedule for ESS 1026. The load prediction may be generated by load model 1324 based on the most recently received data or set of data and can depend on itself (e.g., on past load predictions). Cost minimizer 1304 can be configured to perform an optimization with the load prediction of load/rate predictor 1306 (and/or a rate prediction of load/rate predictor 1306) and data of historical database 1308 to determine amounts to charge and/or discharge ESS 1026 by at particular amounts across a time horizon. Cost minimizer 1304 can utilize an objective function and/or constraints as described with reference to FIG. 12 to minimize costs and/or maximize battery life.

Cloud platform 1302 can be configured to communicate a determined charging and/or discharging schedule to ESS controller 1222 via network 1322. ESS controller 1222 may include scheduler 1326. Scheduler 1326 can be configured to receive the charging and/or discharging schedule from cloud platform 1302 and cause ESS 1026 to charge and/or discharge based on the charging and/or discharging schedule.

Figure 14:
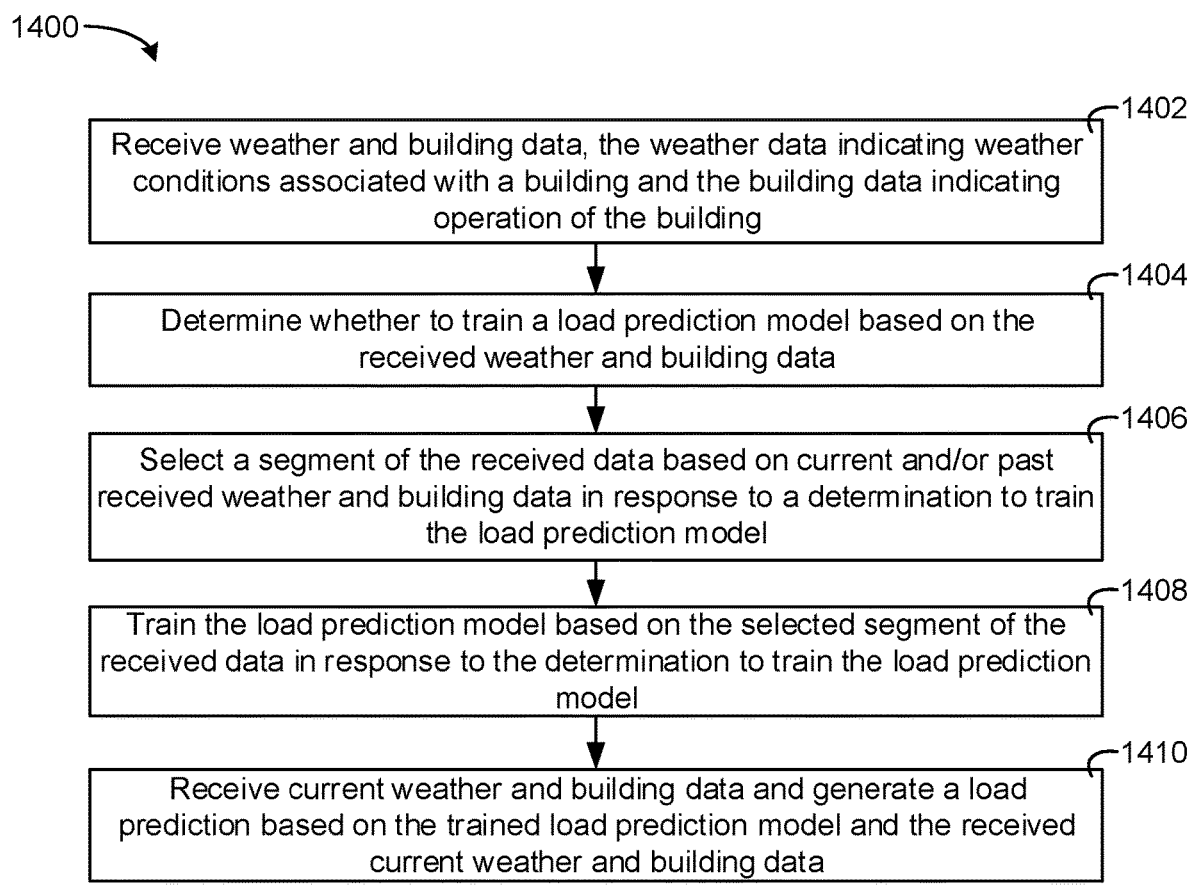
FIG. 14 is a flow chart of a process of dynamically predicting an electrical load of a building that can be performed by the high level optimizer of FIG. 12, according to an exemplary embodiment.

Referring now to FIG. 14, a process 1400 for determining a load prediction is shown, according to an exemplary embodiment. Energy storage controller 506, controller 552, planning tool 702, and/or cloud platform 1302 can be configured to perform process 1400. Furthermore, any computing device as described herein can be configured to perform process 1400.

In step 1402, historian 1116 can be configured to receive weather and building data (e.g., from utilities 510, building status monitor 624, and weather services 604), the weather data indicating weather conditions associated with a building and the building data indicating operation of the building. The building data can include time of day, day of week, occupancy data, load meter data, ambient temperature, time-of-use cost, and/or demand cost. Furthermore, weather data can include ambient temperature, ambient humidity, snow, building temperature, etc.

In step 1404, the trigger 1102 can be configured to determine whether to train a load prediction model based on the received weather and building data. For example, the trigger 1102 can analyze patterns in the weather data and/or the building data. For example, if the ambient temperature has dropped below or risen above a predefined amount, this may be an indication that the trigger 1102 should cause the load prediction model to be retrained. In another example, an increase in occupancy for a predefined amount of time may indicate a change in use of the building. For example, if occupancy has dropped below a predefined amount for a week at a school building, this may indicate that it is summer and fewer students are at the building. This may be an indication that the load prediction model, load model 1128, should be retrained.

In step 1406, data selector 1110 can be configured to select a segment of the received data based on current and/or past received weather and building data in response to a determination to train the load prediction model 1128. Different triggers to train the load prediction model 1128 may be associated with various selections of training data. For example, an increase in ambient temperature over four months may indicate that season has changed and that new training data is needed for retraining the load prediction model. The training data may be selected as the past two months of training data. However, for a change in occupancy at a school for the summer may require the past five days of data to be used as training data.

In step 1408, model manager 1122 can be configured to train load prediction model 1128 based on the selected segment of the received data in response to the determination to train the load prediction model 1128. The model manager 1122 can train one or multiple load prediction models via various training algorithms, for example, the model manager 1122 can train Artificial Neural Networks, Bayesian Models, etc.

In step 1410, predictor 1112 can be configured to receive current weather and building data and generate a load prediction based on the trained load prediction model 1128 and the received current weather and building data. The predictor 1112 can utilize the current day to make load predictions over a time horizon into the future at discrete time steps. The load predictions can be utilized in various optimizations and/or control algorithms for causing the ESS 1026 to charge and/or discharge energy.

Figure 15:
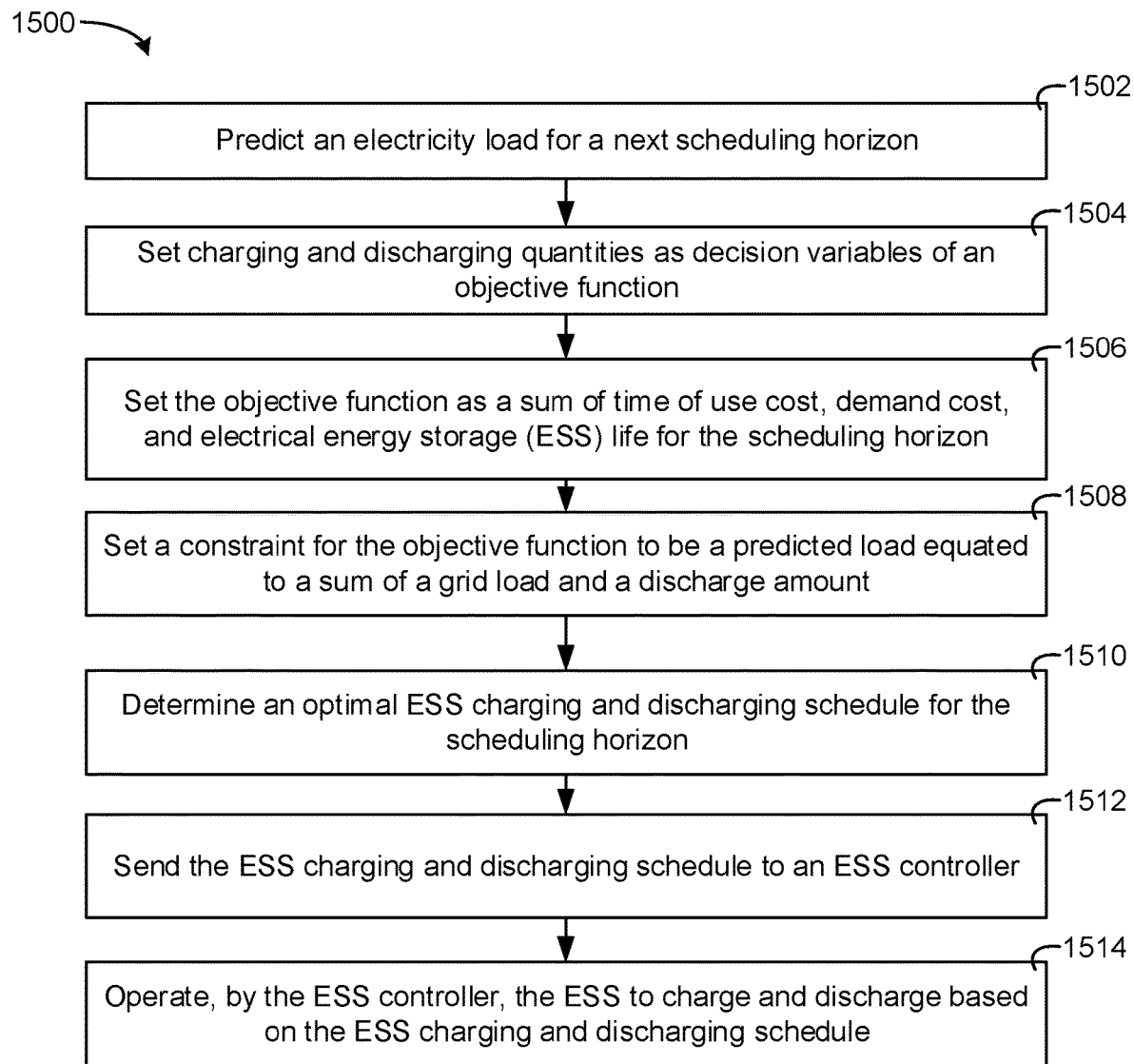
FIG. 15 is a flow chart of a process of generating a charging and discharging schedule for the ESS of FIG. 10 based on a load prediction that can be performed by the high level optimizer of FIG. 12, according to an exemplary embodiment.

Referring now to FIG. 15, a process 1500 of using a predicted electrical load to schedule charging/discharging of a battery is shown, according to an exemplary embodiment. Energy storage controller 506, controller 552, planning tool 702, and/or cloud platform 1302 can be configured to perform process 1500. Furthermore, any computing device as described herein can be configured to perform process 1500.

In step 1502, load/rate predictor 622 can predict an electricity load for a next scheduling horizon. The load/rate predictor 622 utilizes a dynamically trained load prediction model 1128. For example, load/rate predictor 622 can train and/or retrain a load prediction model 1128 based on the process 1400 as described with reference to FIG. 14. The load/rate predictor 622 can utilize the training data and/or newly received data to perform a prediction with the load prediction model 1128 for the next scheduling horizon. The scheduling horizon may be a collection of discrete time intervals into the future that high level optimizer 632 can generate for use in determining and/or optimizing the energy allocation of a building and/or campus (e.g., allocated to HVAC system 1012, lighting system 1014, equipment 1016, and/or to ESS 1026).

In step 1504, decision variable setter 1204 can be configured to set charging and discharging quantities (e.g., $x_t^{in}$ and $x_t^{out}$) as decision variables of an objective function 1221. The charging and discharging quantities can be variables for each of the time steps of the scheduling horizon for charging or discharging the ESS 1026.

In step 1506, objective function setter 1214 can be configured to set the objective function as a sum of time-of-use cost, demand cost, and ESS life for the scheduling horizon. As previously described herein, the objective function 1221 can be:

$$\min_{x_t^{in}, x_t^{out}} \left\{ \sum_{t=1}^{T} \alpha_t C_i^{TOU}\left(p_t + \frac{x_t^{in}}{\lambda^c}\right) + \max_{1 \leq t \leq T}\left(p_t + \frac{x_t^{in}}{\lambda^c}\right) C_t^{DC} \delta \right\}$$

In step 1508, constraint setter 1208 can be configured to set a constraint for the objective function to be predicted load equated to a sum of a grid load and a discharge amount for the scheduling horizon. The constraint may be:

$$L_t = p_t + x_t^{out} \cdot \lambda^d$$

where $L_t$ is the predicted load and is equated to a sum of the grid load, $p_t$, and the discharge amount $x_t^{out} \cdot \lambda^d$ where $x_t^{out}$ is powered discharged by the ESS 1026 at a particular time and $\lambda^d$ is the discharging efficiency. In some embodiments, there may be any number of constraints, some of which model the physical nature of the ESS 1026 and/or the life of the ESS 1026, these constraints are described in further detail elsewhere herein.

In step 1510, ESS optimizer 1216 can determine an optimal ESS charging and discharging schedule for the scheduling horizon. The ESS optimizer 1216 can optimize the objective function 1221 over the time horizon based on the constraints 1220 and/or the predicted load. The result may be a schedule including an indication to charge or discharge the ESS 1026 at multiple time steps and at particular amounts.

In step 1512, charging/discharging schedule 1218 can be configured to send the ESS charging and discharging schedule to ESS controller 1222. In step 1514, ESS 1026 can be configured to be operated by the ESS controller to charge and discharge based on the ESS charging and discharging schedule.

Figure 16:
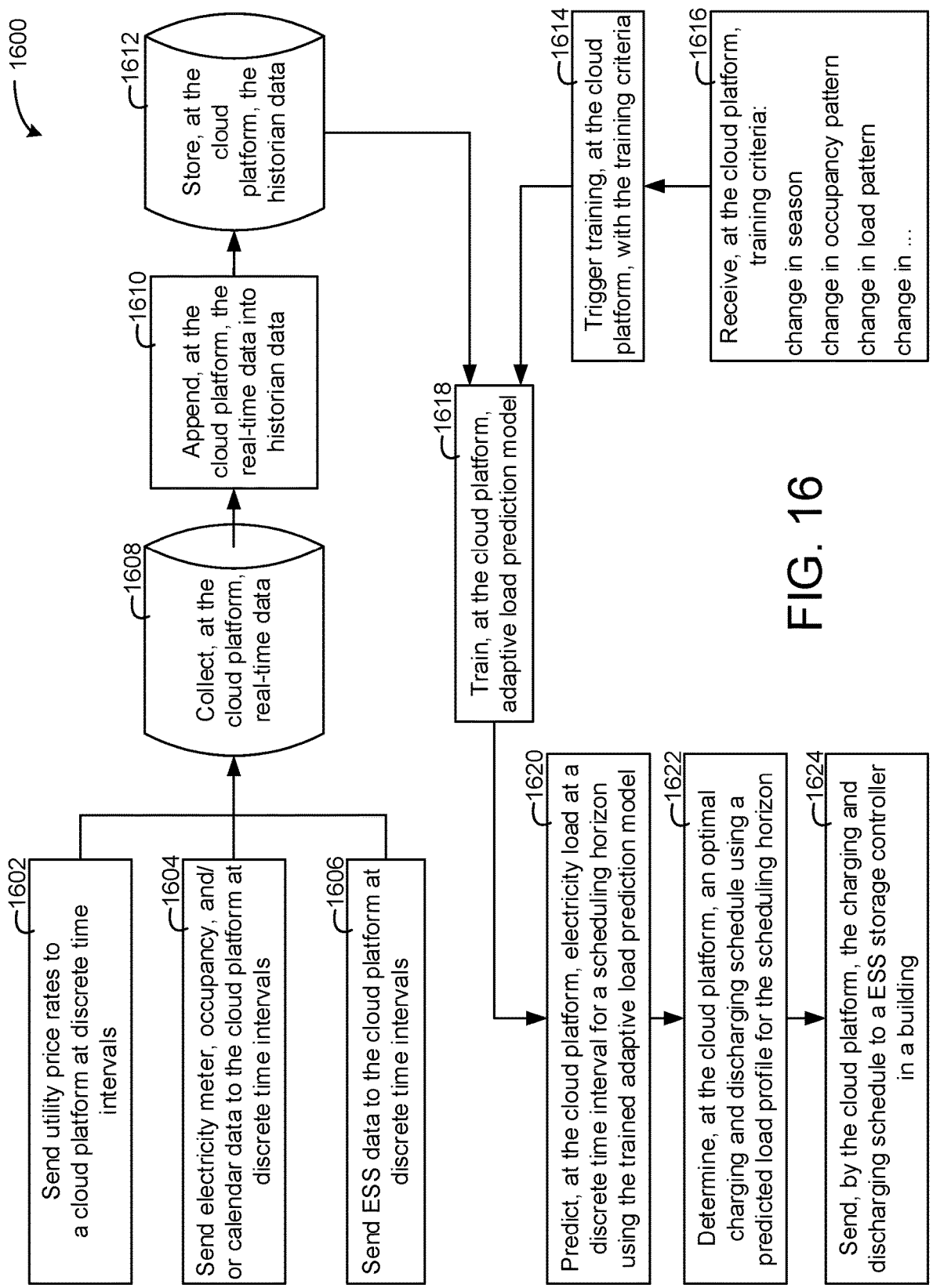
FIG. 16 is a flow diagram of a process of using the cloud platform of FIG. 13 to generate a charging and discharging schedule based on dynamic load model training, according to an exemplary embodiment.

Referring now to FIG. 16, a process 1600 of using the cloud platform 1302 to charge and discharge an ESS based on dynamic load model training is shown, according to an exemplary embodiment. Energy storage controller 506, controller 552, planning tool 702, and/or cloud platform 1302 can be configured to perform process 1600. Furthermore, any computing device as described herein can be configured to perform process 1600.

In step 1602, systems of the campus 102 can be configured to send utility charge rates, e.g., time-of-use cost and demand charge to the cloud platform 1502 at discrete intervals. For examples, the ESS controller 1222 and/or the building management system 606 can determine and/or receive the utility charge rates. For example, the rates can be received from electric grid 1030 by the ESS controller 1222 and/or the building management system 606 and sent to the cloud platform 1302. In some embodiments, the cloud platform 1302 receives the utility charge rates directly from the electric grid 1030. In various embodiments, the cloud platform 1302 receives the utility charge rates at predefined intervals. For example, the data may be received every fifteen minutes. In some embodiments, the data is a time-series set of data including discrete fifteen minute interval data points.

In step 1604, systems of the campus 102 can send electricity meter data, occupancy, calendar data, and/or any other type of building data to the cloud platform 1502. In some embodiments, the meter data can be indicative of a partial and/or entire load of the campus 102. For example, the meter data may be meter data of various individual subsystems of a building and/or subsystem (HVAC, lighting, etc.) of the campus 102. The occupancy data may be an occupancy level of the campus 102 and/or buildings within the campus 102 at particular times. The occupancy data may be determined via one or multiple occupancy sensors and/or systems, e.g., the occupancy sensor 1320. The calendar data may be a current time of day and/or a current day of week. In this regard, if the data of steps 1602-1604 is sent at the same interval, the occupancy and/or meter data can be linked with a particular time of day and/or day of week.

In step 1606, campus 102 can be configured to send ESS data to the cloud platform 1302 at discrete time intervals (e.g., 15 minutes). The ESS data may be various ESS parameters for properly determining whether to charge and/or discharge the ESS 1026 by determining a charging and/or discharging schedule. In some embodiments, the ESS data is measured by, and/or determined based on measurements of, sensor 1316. Sensor 1316 can be configured to monitor the charging and/or discharging of ESS 1026, the state of charge of ESS 1026, and/or any other parameters. The ESS data can be a total amount of energy stored in the ESS 1026 at a particular time, a minimum charging rate, a maximum charging rate, an on and/or off status of the ESS 1026, a self-discharging rate, etc.

In step 1608, the cloud platform 1302 can collect real-time data, the data received in the steps 1602-1606. The real-time data collected can be the real-time data 1325. In step 1610, the cloud platform 1302 can append the real-time data 1325 into historical data stored in the historian database 1308. In some embodiments, historian 1310 receives collects the real-time data 1325 and adds it to historical database 1308. The historian 1310 can append the data to existing data of the historian database 1308. For example, historian 1310 can maintain multiple timeseries for occupancy, load, prices, etc. and can append new data to the end of the timeseries to maintain the historical data. The appended data can be stored in the historian database 1308 in step 1612.

In step 1616, the cloud platform 1302 can receive training criteria for triggering the training and/or retraining of the adaptive load prediction model 1324. For example, the criteria may be the criteria utilized by trigger 1102 and/or data selector 1110 to trigger training and/or retraining and/or select data to use in the training and/or retraining. The criteria may be a change in season. For example, certain dates and/or months may indicate an update in training to the adaptive load prediction model 1324.

For example, once the current day (e.g., either determined by the cloud platform 1302 or received in step 1604) is equal to a particular day (e.g., September $1^{st}$, an indication of a change from Summer to Fall) step 1618 could be triggered by the cloud platform 1302 to cause the adaptive load prediction model 1324 to be retrained (step 1614). Furthermore, examples of training criteria may be changes in occupancy patterns (e.g., occupancy levels as received in step 1604) raising or falling below predefined amounts for predefined lengths of time. Furthermore the training criteria may be a change in load pattern.

For example, based on meter data which may be indicative of a load of campus 102 (e.g., the meter data received in step 1604), the cloud platform 1302 can trigger the training to begin. For example, a change in load may be the comparing actual measured load to predicted load by the adaptive prediction model 1324 and identifying that the prediction and actual load deviate by a predefined amount. Furthermore, this deviation (e.g., absolute value of the deviation) could be performed for multiple days (e.g., for an entire week) and if the average deviation as determined for the multiple days is greater than a predefined amount, training can be performed. In some embodiments, the meter data is analyzed to determine if the load of the building is trending up or down.

In step 1618, load/rate predictor 1306 can train a machine learning model of electricity load when the training criteria received in step 1616 is triggered. For example, in response to criteria triggering, load/rate predictor 1306 can retrain load model 1324. However, in some cases, if none of the criteria are met, load/rate predictor 1306 can skip the training of the load model 1324 (i.e., skip step 1618).

In step 1620, load/rate predictor 1306 can predict an electricity load a discrete time interval for the scheduling horizon using the trained load prediction of step 1618. In some embodiments, the load model 1324 can automatically generate the predictions with no data inputs. In some embodiments, the inputs to the model are weather forecast, time of day, day of week, occupancy, previous load, etc. In some embodiments, a recent window of data of the historian database 1308 is used to perform the prediction. Load/rate predictor 1306 can generate a load prediction for a particular day or week (e.g., a single value for a window of time). In some embodiments, load/rate predictor 1306 is configured to generate a load prediction that is continuous over a time window (e.g., an equation or a set of coefficients from which particular values of the load are derived). Furthermore in some embodiments, the load/rate predictor 1306 can generate a set of discrete load predictions for multiple time steps of a time horizon.

In step 1622, load/rate predictor 1306 can be configured to determine an optimal charging and discharging schedule using the predicted load profile for the scheduling horizon of step 1620. Load/rate predictor 1306 can determine the charging and/or discharging by performing an objective function optimization with various constraints. For example, the load/rate predictor 1306 can optimize the object function:

$$\min_{x_t^{in}, x_t^{out}} \left\{ \sum_{t=1}^{T} \alpha_t C_i^{TOU}\left(p_t + \frac{x_t^{in}}{\lambda^c}\right) + \max_{1 \le t \le T}\left(p_t + \frac{x_t^{in}}{\lambda^c}\right) C_t^{DC} \delta \right\}$$

with the following constraints:

$$L_t = p_t + x_t^{out} \cdot \lambda^d$$

In step 1624, load/rate predictor 1306 can be configured to send the charging and/or discharging schedule to the ESS storage 1222 in the building. The ESS controller 1222 can cause the ESS 1026 to charge and/or discharge based on the received charging and/or discharging schedule.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building energy system for a building, the system comprising:
   an energy storage system (ESS) configured to store energy received from an energy source and provide the energy to one or more pieces of building equipment to operate the one or more pieces of building equipment;
   a local building system configured to collect building data and communicate the building data to a cloud platform via a network, the building data indicating a state of the building; and
   the cloud platform configured to:
      receive the building data from the local building system via the network;
      apply a plurality of retraining rules to the building data to trigger retraining of a trained load prediction model by identifying a triggered retraining rule of the plurality of retraining rules triggered based on the building data, the plurality of retraining rules, when triggered, indicating events occurring at the building, the events causing a performance of the trained load prediction model to be reduced;
      retrain the trained load prediction model based on at least some of the building data in response to identifying the triggered retraining rule;
      determine a load prediction for the building based on a retrained load prediction model; and
      cause the local building system to operate, based on the load prediction, the ESS to store the energy received from the energy source or provide the energy to the one or more pieces of building equipment to operate the one or more pieces of building equipment by communicating with the local building system via the network.

2. The system of claim 1, wherein the cloud platform is configured to select a portion of the building data based on values of the building data, wherein the portion of the building data is data of a preceding time period, wherein a length of the preceding time period is based on the values of the building data;
   wherein the cloud platform is configured to retrain the trained load prediction model based on the portion of the building data.

3. The system of claim 1, wherein the cloud platform is configured to:
   receive current building data, wherein the current building data comprises at least one of a weather forecast, a current occupancy level, an actual previous load, a previous load prediction, a time of day, or a day of week; and generate the load prediction based on the retrained load prediction model with the current building data as an input to the retrained load prediction model.

4. The system of claim 1, wherein the building data comprises building occupancy data;
wherein the cloud platform is configured to determine whether to retrain the trained load prediction model based on the building occupancy data by determining whether the building occupancy data indicates a change in an occupancy pattern of the building.

5. The system of claim 1, wherein the building data comprises weather data indicating weather conditions associated with the building;
wherein the cloud platform is configured to determine whether to retrain the trained load prediction model based on the weather data indicating a change in a pattern of the weather conditions associated with the building.

6. The system of claim 1, wherein the building data comprises actual load data indicating an actual load of the building;
wherein the cloud platform is configured to determine whether to retrain the trained load prediction model by determining whether the actual load data indicates a change in a load pattern of the building.

7. The system of claim 1, wherein the building data comprises calendar information indicating at least one of a current date and a current time;
wherein the cloud platform is configured to determine whether to retrain the trained load prediction model by determining, based on the calendar information, whether an environmental season has changed.

8. The system of claim 1, wherein the local building system is configured to communicate the building data to the cloud platform by transmitting the building data to the cloud platform via the network at a particular time interval.

9. The system of claim 8, wherein the cloud platform is configured to:
receive the building data transmitted by the local building system via the network; and
store the building data in a historical database by appending the building data transmitted by the local building system to other building data of the historical database in response to a reception of the building data transmitted by the local building system.

10. The system of claim 1, wherein the energy source is an electric grid configured to provide electrical energy to the ESS and the one or more pieces of building equipment;
wherein the ESS comprises a battery configured to store the electrical energy received from the electric grid and provide the electrical energy to the one or more pieces of building equipment by charging and discharging the battery based on the electrical energy received from the electric grid.

11. The system of claim 10, wherein the cloud platform is configured to:
generate an objective function representing costs of the electrical energy provided by the electric grid, wherein the objective function comprises one or more electric rates;
optimize the objective function with the load prediction to generate a schedule for charging and discharging the battery; and
cause the local building system to operate the battery to charge or discharge based on the schedule.

12. The system of claim 11, wherein optimizing the objective function with the load prediction comprises optimizing the objective function with one or more constraints;
wherein the one or more constraints comprise a constraint comprising an equation, wherein the equation is the load prediction set equal to a sum of an amount of electric load consumed from the electric grid by the one or more pieces of building equipment and an amount of load provided by the battery to the one or more pieces of building equipment by discharging the electrical energy.

13. The system of claim 11, wherein the load prediction comprises a plurality of load values, each load value associated with a particular time of a plurality of times of a time window;
wherein the schedule comprises a plurality of decisions to charge the battery or discharge the battery at the plurality of times of the time window;
wherein optimizing the objective function with the load prediction to generate the schedule comprises optimizing the objective function over the time window.

14. The system of claim 11, wherein the cloud platform is configured to send, by the network, the schedule to the local building system;
wherein the local building system is configured to:
receive the schedule from the cloud platform via the network; and
operate the battery to charge or discharge based on the schedule.

15. A method of managing energy for a building, the method comprising:
collecting, by a local building system, building data;
communicating, by the local building system, the building data to a cloud platform via a network, the building data indicating a state of the building;
receiving, by the cloud platform, the building data from the local building system via the network;
applying, by the cloud platform, a plurality of retraining rules to the building data to trigger retraining of a trained load prediction model by identifying a triggered retraining rule of the plurality of retraining rules triggered based on the building data, the plurality of retraining rules, when triggered, indicating events occurring at the building, the events causing a performance of the trained load prediction model to be reduced;
retraining, by the cloud platform, the trained load prediction model based on at least some of the building data in response to identifying the triggered retraining rule;
determining, by the cloud platform, a load prediction for the building based on a retrained load prediction model; and
causing, by the cloud platform, the local building system to operate, based on the load prediction, an energy storage system (ESS) to store energy received from an energy source or provide the energy to one or more pieces of building equipment to operate the one or more pieces of building equipment by communicating with the local building system via the network.

16. The method of claim 15, wherein communicating, by the local building system, the building data to the cloud platform comprises transmitting the building data to the cloud platform via the network at a particular time interval.

17. The method of claim 16, further comprising:
receiving, by the cloud platform, the building data transmitted by the local building system via the network; and storing, by the cloud platform, the building data in a historical database by appending the building data transmitted by the local building system to other building data of the historical database in response to a reception of the building data transmitted by the local building system.

18. The method of claim 15, wherein the energy source is an electric grid configured to provide electrical energy to the ESS and the one or more pieces of building equipment;
   wherein the ESS comprises a battery configured to store the electrical energy received from the electric grid and provide the electrical energy to the one or more pieces of building equipment by charging and discharging the battery based on the electrical energy received from the electric grid;
   wherein the method further comprises:
      generating, by the cloud platform, an objective function representing costs of the electrical energy provided by the electric grid, wherein the objective function comprises one or more electric rates;
      optimizing, by the cloud platform, the objective function with the load prediction to generate a schedule for charging and discharging the battery; and
      operating, by the cloud platform, the battery to charge or discharge based on the schedule.

19. The method of claim 18, further comprising:
   sending, by the cloud platform via the network, the schedule to the local building system;
   receiving, by the local building system, the schedule from the cloud platform via the network; and
   operating, by the local building system, the battery to charge or discharge based on the schedule.

20. A cloud platform for managing energy of a building, the cloud platform comprising a processing circuit configured to:
   receive building data from a local building system of the building via a network, the building data indicating a state of the building;
   apply a plurality of retraining rules to the building data to trigger retraining of a trained load prediction model by identifying a triggered retraining rule of the plurality of retraining rules triggered based on the building data, the plurality of retraining rules, when triggered, indicating events occurring at the building, the events causing a performance of the trained load prediction model to be reduced;
   retrain the trained load prediction model based on at least some of the building data in response to identifying the triggered retraining rule;
   determine a load prediction for the building based on a retrained load prediction model; and
   cause the local building system to operate, based on the load prediction, an energy storage system (ESS) to store energy received from an energy source or provide the energy to one or more pieces of building equipment to operate the one or more pieces of building equipment by communicating with the local building system via the network.

21. The building energy system of claim 1, wherein the events include at least one of a change in season at the building, a change in occupancy within the building, a change to a physical construction of the building, or a change in a pattern of actual load of the building.

22. The method of claim 15, wherein the events include at least one of a change in season at the building, a change in occupancy within the building, a change to a physical construction of the building, or a change in a pattern of actual load of the building.

* * * * *